(12) United States Patent
Nojima et al.

(10) Patent No.: US 12,399,063 B2
(45) Date of Patent: Aug. 26, 2025

(54) SPECTROSCOPIC ANALYSIS SYSTEM AND SPECTROSCOPIC ANALYSIS METHOD

(71) Applicant: HITACHI HIGH-TECH SCIENCE CORPORATION, Tokyo (JP)

(72) Inventors: Akihiro Nojima, Tokyo (JP); Yusuke Kaga, Tokyo (JP); Takuya Kambayashi, Tokyo (JP); Jun Horigome, Tokyo (JP); Kai Maruyama, Tokyo (JP)

(73) Assignee: HITACHI HIGH-TECH ANALYSIS CORPORATION, Tokyo (JP)

( * ) Notice: Subject to any disclaimer, the term of this patent is extended or adjusted under 35 U.S.C. 154(b) by 32 days.

(21) Appl. No.: 18/343,129

(22) Filed: Jun. 28, 2023

(65) Prior Publication Data

US 2024/0011833 A1    Jan. 11, 2024

(30) Foreign Application Priority Data

Jul. 11, 2022 (JP) .................... 2022-111148

(51) Int. Cl.
*G01J 3/02* (2006.01)
*G01J 3/06* (2006.01)
(Continued)

(52) U.S. Cl.
CPC .......... *G01J 3/4406* (2013.01); *G01J 3/0264* (2013.01); *G01J 3/027* (2013.01); *G01J 3/06* (2013.01);
(Continued)

(58) Field of Classification Search
CPC ........ G01J 3/4406; G01J 3/0264; G01J 3/027; G01J 3/06; G01J 3/18; G01J 3/14; G01J 3/26; G01J 3/28
See application file for complete search history.

(56) References Cited

U.S. PATENT DOCUMENTS 10,712,275 B2 *  7/2020  Rentzepis ................. G01J 3/42
2008/0261220 A1 * 10/2008  Cracauer .................. C12P 19/34
                                                                435/6.12
(Continued)

FOREIGN PATENT DOCUMENTS

JP      2020-076612 A    5/2020

OTHER PUBLICATIONS

Tsuta, et al., "Techniques and Applications of Quality Evaluation of Food by Fluorescence Fingerprints", Journal of Japan Society for Bioscience, Biotechnology, and Agrochemistry, 2015, vol. 53, No. 5, pp. 285 to 292 (with English translation).

(Continued)

*Primary Examiner* — Abdullahi Nur
(74) *Attorney, Agent, or Firm* — Baker Botts L.L.P.

(57) ABSTRACT

A spectroscopic analysis system includes: an operation panel configured to receive an input of at least one of an upper limit value of a measurement period of a spectroscopic analysis spectrum or a lower limit value of measurement accuracy as a user setting condition related to measurement of the spectroscopic analysis spectrum of a sample; and a control unit configured to derive a predetermined recommended measurement condition that satisfies the user setting condition and cause a display unit to display the recommended measurement condition, in which the recommended measurement condition is at least one of a wavelength range of light to be used for measurement of the spectroscopic analysis spectrum, a sampling interval of a wavelength of the light, a slit width of a diffraction grating of a spectroscope that disperses the light, or a sweep speed of the wavelength of the light.

13 Claims, 13 Drawing Sheets

(51) Int. Cl.
*G01J 3/44* (2006.01)
*G01J 3/28* (2006.01)

(52) U.S. Cl.
CPC ... *G01J 2003/064* (2013.01); *G01J 2003/068* (2013.01); *G01J 2003/2836* (2013.01)

(56) References Cited

U.S. PATENT DOCUMENTS

2011/0222060 A1* 9/2011 Smith ................. G01J 3/26
359/578
2018/0067048 A1 3/2018 Horigome et al.
2020/0033838 A1* 1/2020 Fujita ................. G05B 19/4155

OTHER PUBLICATIONS

Extended European Search Report, mailed Nov. 2, 2023, for European Application No. 23181505.1.

* cited by examiner

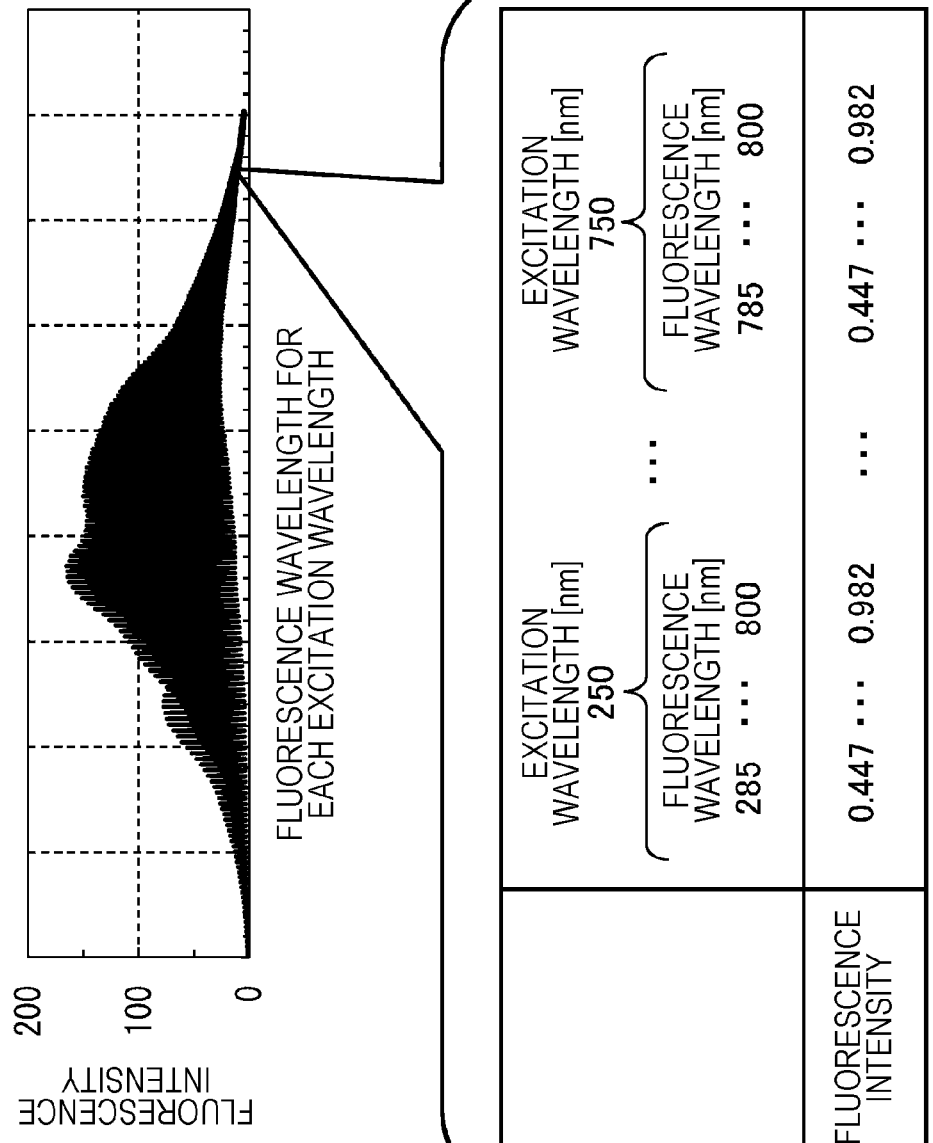

FIG. 5

■ MEASUREMENT CONDITIONS

| RANGE OF EXCITATION WAVELENGTH: | nm — nm | | SLIT WIDTH FOR EXCITATION LIGHT: | nm |
| RANGE OF FLUORESCENCE WAVELENGTH: | nm — nm | | SLIT WIDTH FOR FLUORESCENCE: | nm |
| SAMPLING INTERVAL OF EXCITATION LIGHT: | nm | | WAVELENGTH SCAN SPEED | nm/SECOND |
| SAMPLING INTERVAL OF FLUORESCENCE: | nm | | | |

■ ANALYSIS CONDITIONS

| MAXIMUM MEASUREMENT PERIOD: | SECOND |
| WAVELENGTH REGION SELECTION METHOD: | |
| REGRESSION METHOD: | |
| EXCLUDED REGION: | nm — nm |

■ MEASUREMENT RESULT

FIG. 8

| EXCITATION WAVELENGTH [nm] | FLUORESCENCE WAVELENGTH [nm] | FLUORESCENCE INTENSITY |
|---|---|---|
| 250 | 404 | 1.33 |
| 251 | 404 | 1.22 |
| 252 | 404 | 1.29 |
| 253 | 404 | 1.23 |
| 254 | 404 | 1.13 |
| 255 | 404 | 1.25 |
| 256 | 404 | 1.28 |
| 257 | 404 | 1.31 |
| ⋮ | ⋮ | ⋮ |

FIG. 9

| EXCITATION WAVELENGTH SAMPLING [nm] | RMSECV | THE NUMBER OF REGIONS | MEASUREMENT PERIOD [s] |
|---|---|---|---|
| 1 | 54.3 | 2 | 45.9 |
| 2 | 28.7 | 3 | 49.5 |
| 3 | 31.8 | 3 | 15.3 |

SPECTROSCOPIC ANALYSIS SYSTEM AND SPECTROSCOPIC ANALYSIS METHOD

CROSS-REFERENCE TO RELATED APPLICATIONS

This application is based on and claims priority from Japanese Patent Application No. 2022-111148 filed on Jul. 11, 2022, the contents of which are incorporated by reference in their entirety.

BACKGROUND

Technical Field

The disclosure relates to a spectroscopic analysis system, and the like.

Related Art

A spectroscopic analysis method is known as a method for measuring a spectrum of light when a substance absorbs or emits light and performing composition discrimination or concentration quantification of the substance. Regarding fluorescence fingerprint analysis which is one such spectroscopic analysis method, for example, Patent Literature 1 (Japanese Unexamined Patent Application Publication No. 2020-76612) describes "measuring fluorescence intensity while changing an excitation wavelength that is radiated and a fluorescence wavelength that is observed in a stepwise manner for each of a plurality of extracted samples, and obtaining a plurality of pieces of fluorescence fingerprint information as fluorescence fingerprint continuous body information".

Further, Non-Patent Literature 1 (Mizuki Tsuta, et al., "Techniques and Applications of Quality Evaluation of Food by Fluorescence Fingerprints", Journal of Japan Society for Bioscience, Biotechnology, and Agrochemistry, 2015, Vol. 53, No. 5, pages 285 to 292) describes that "in fluorescence fingerprint (or excitation-emission matrix) measurement, intensity of fluorescence is measured while changing both wavelength conditions of excitation light and wavelength conditions of fluorescence to be observed (solid arrow in FIG. 2 of Non-Patent Literature 1). That is, whether electronic excitation occurs in a target sample and whether fluorescence is emitted are investigated in a brute-force manner".

For example, in order to obtain a high-resolution measurement result in the entire wavelength region in a spectroscopic analysis method, it takes a long time to perform the measurement. On the other hand, in a case where measurement is performed for only a specific wavelength by filter spectroscopy or the like, there is a possibility that data of an important spectrum cannot be obtained. It is desirable to enable appropriate measurement even in a case where there is a restriction on a measurement period or the like based on a spectroscopic analysis method.

Thus, an object of the disclosure is to provide a spectroscopic analysis system, or the like, that enables appropriate measurement even in a case where there is a restriction on a measurement period or the like.

SUMMARY

A spectroscopic analysis system according to the disclosure includes: an input unit configured to receive an input of at least one of an upper limit value of a measurement period of a spectroscopic analysis spectrum or a lower limit value of measurement accuracy as a user setting condition related to measurement of the spectroscopic analysis spectrum of a sample; and a control unit configured to derive a predetermined recommended measurement condition that satisfies the user setting condition and cause a display device to display the recommended measurement condition, in which the recommended measurement condition includes at least one of a wavelength range of light to be used for measurement of the spectroscopic analysis spectrum, a sampling interval of a wavelength of the light, a slit width of a diffraction grating of a spectroscope that disperses the light, or a sweep speed of the wavelength of the light.

According to the disclosure, it is possible to provide a spectroscopic analysis system, or the like, that enables appropriate measurement even in a case where there is a restriction on a measurement period or the like.

BRIEF DESCRIPTION OF DRAWINGS

FIG. 2C is an explanatory diagram of data obtained by converting the spectroscopic analysis spectrum obtained by the spectroscopic analysis system according to the first embodiment into one dimension.

FIG. 5 is a display example of a setting screen of measurement conditions, and the like, in the spectroscopic analysis system according to the first embodiment.

FIG. 8 is an explanatory diagram illustrating an example of a case where a fluorescence wavelength is fixed and an excitation wavelength is swept at a predetermined value in the spectroscopic analysis system according to the first embodiment.

FIG. 9 is an explanatory diagram indicating an experimental result in fluorescence fingerprint analysis of the spectroscopic analysis system according to the first embodiment.

DETAILED DESCRIPTION

First Embodiment

Figure 1:
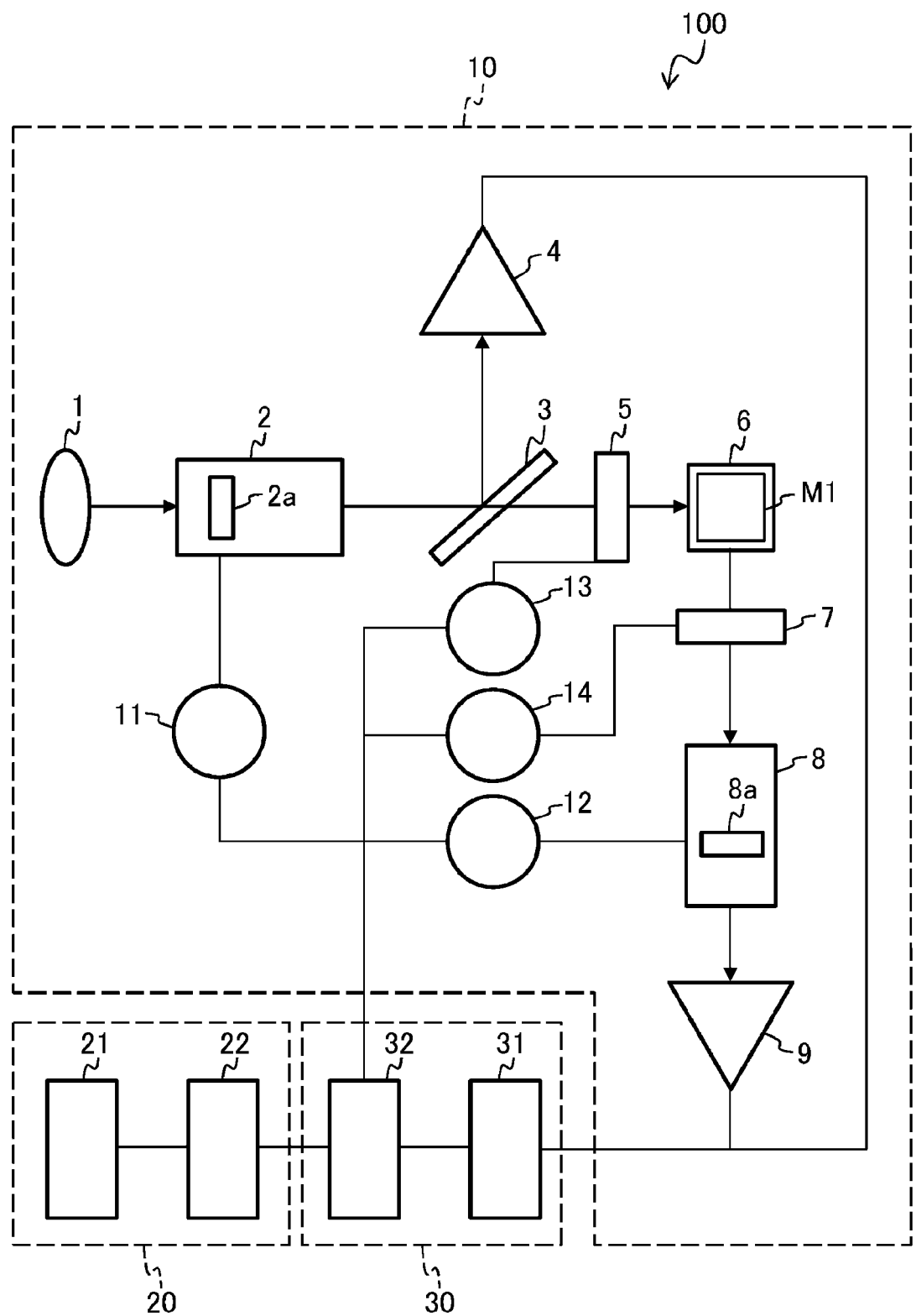
FIG. 1 is a configuration diagram of a spectroscopic analysis system according to a first embodiment.

FIG. 1 is a configuration diagram of a spectroscopic analysis system 100 according to a first embodiment.

The spectroscopic analysis system 100 illustrated in FIG. 1 is a system that performs composition discrimination, concentration quantification, or the like of a sample on the basis of a spectroscopic analysis method. The spectroscopic analysis method is a method for performing composition discrimination, concentration quantification, or the like of a sample on the basis of a spectrum of light when the sample absorbs or emits light. Examples of the sample to be subjected to such a spectroscopic analysis method include, but are not limited to, human or animal cells and blood, culture solutions, foods, beverages, dyes, and minerals (for example, jewelry). In addition, the spectroscopic analysis method may be used for measurement of suspended substances in the atmosphere. The spectroscopic analysis method includes fluorescence fingerprint analysis and absorption spectroscopy. Hereinafter, as an example, a case where fluorescence fingerprint analysis is used will be described.

As illustrated in FIG. 1, the spectroscopic analysis system 100 includes a photometer unit 10, an operation unit 20, and a data processing unit 30. The photometer unit 10 is a device that irradiates a sample Ml with excitation light and measures fluorescence emitted from the sample Ml accordingly. Note that the photometer unit 10 is shielded by a housing (not illustrated) so that light does not enter the photometer unit 10 from the outside.

For example, when the sample Ml is irradiated with light, electrons contained in molecules of the sample Ml absorb energy of light, transition to an orbit with a higher energy level, and are put into an excited state. Light that causes such a phenomenon is "excitation light". Further, light emitted when electrons in an excited state return to an original ground state is "fluorescence".

In the fluorescence fingerprint analysis, intensity of fluorescence is measured by changing a wavelength of excitation light with which the sample Ml is irradiated and a wavelength of fluorescence to be measured. As a result, a spectroscopic analysis spectrum (three-dimensional fluorescence spectrum, fluorescence fingerprint) having three components, an excitation wavelength, a fluorescence wavelength, and fluorescence intensity, is obtained. Because such a spectroscopic analysis spectrum is unique to a substance, it is possible to perform composition discrimination and/or concentration quantification of the substance (sample). In the fluorescence fingerprint analysis, "light to be used for measurement of a spectroscopic analysis spectrum" is excitation light and fluorescence.

As illustrated in FIG. 1, the photometer unit 10 includes a light source 1, an excitation-side spectroscope 2 (spectroscope), a beam splitter 3, a monitor detector 4, an excitation-side filter 5, a sample setting unit 6, a fluorescence-side filter 7, a fluorescence-side spectroscope 8 (spectroscope), and a detector 9. In addition to the above configuration, the photometer unit 10 includes an excitation-side pulse motor 11, a fluorescence-side pulse motor 12, an excitation-side filter pulse motor 13, and a fluorescence-side filter pulse motor 14.

The light source 1 emits predetermined light. As such a light source 1, for example, a xenon lamp, a halogen lamp, or an intermediate-pressure mercury lamp is used. The excitation-side spectroscope 2 disperses light emitted from the light source 1 in a predetermined manner. The excitation-side spectroscope 2 includes a diffraction grating 2a for extracting light having a wavelength in a predetermined range from light that includes various wavelengths. The diffraction grating 2a has, for example, a configuration in which a plurality of fine grooves are provided in parallel at predetermined intervals on a surface of an optical material.

Further, an incident angle of light on the diffraction grating 2a changes according to a rotation angle of the diffraction grating 2a, and a wavelength of light extracted from the diffraction grating 2a changes accordingly. The excitation-side pulse motor 11 adjusts the rotation angle of the diffraction grating 2a of the excitation-side spectroscope 2 on the basis of a command from a control unit 32.

The beam splitter 3 splits light from the excitation-side spectroscope 2 into two (splits a light flux into two). The monitor detector 4 measures intensity of one of the light fluxes divided by the beam splitter 3. The measurement result of the monitor detector 4 is output to an analog-to-digital (A/D) converter 31 as a predetermined electric signal. The excitation-side filter 5 is a filter that transmits light having a wavelength in a predetermined range and blocks the remaining light and is disposed between the beam splitter 3 and the sample setting unit 6. The excitation-side filter 5 includes, for example, a plurality of cut filters (not illustrated). A cut filter selected from the plurality of cut filters is disposed on an optical path by the excitation-side filter pulse motor 13. The excitation-side filter pulse motor 13 moves a predetermined cut filter included in the excitation-side filter 5 onto the optical path on the basis of a command from the control unit 32.

The sample setting unit 6 is a holder for setting the sample Ml to be subjected to the fluorescence fingerprint analysis. In a case where the sample Ml is liquid or gas, a container, or the like, (not illustrated) containing the sample Ml is set in the sample setting unit 6. The light (excitation light) transmitted through the excitation-side filter 5 is incident on the sample Ml.

The fluorescence-side filter 7 is a filter that transmits light having a wavelength in a predetermined range and blocks the remaining light and is disposed between the sample setting unit 6 and the fluorescence-side spectroscope 8. The fluorescence-side filter 7 includes, for example, a plurality of cut filters (not illustrated). A cut filter selected from the plurality of cut filters is disposed on the optical path by the fluorescence-side filter pulse motor 14. The fluorescence-side filter pulse motor 14 moves a predetermined cut filter included in the fluorescence-side filter 7 onto the optical path on the basis of a command from the control unit 32.

The fluorescence-side spectroscope 8, which disperses light (fluorescence) emitted from the sample Ml, includes a diffraction grating 8a. The fluorescence-side pulse motor 12 adjusts a rotation angle of the diffraction grating 8a of the fluorescence-side spectroscope 8 on the basis of a command from the control unit 32. The detector 9 converts light (fluorescence) from the fluorescence-side spectroscope 8 into a predetermined electric signal. The electric signal (analog signal) from the detector 9 is output to the A/D converter 31. Note that the configuration illustrated in FIG. 1 is an example, and the configuration of the photometer unit 10 is not limited thereto.

The operation unit 20 illustrated in FIG. 1 receives a data input from the user and displays a processing result of the control unit 32. The operation unit 20 includes an operation panel 21 (input unit) and a display unit 22 (display device). The operation panel 21, which receives an input of a measurement condition of the fluorescence fingerprint analysis, or the like, on the basis of operation by a user, includes predetermined keys (not illustrated) and buttons (not illustrated). Note that a keyboard (not illustrated) or a mouse (not illustrated) may be used instead of the operation panel 21. The display unit 22, which is, for example, a display, displays a processing result or the like of the control unit 32 in a predetermined manner in addition to displaying a setting screen of measurement conditions or the like.

The data processing unit 30 illustrated in FIG. 1 includes the A/D converter 31 and the control unit 32. The A/D converter 31 converts an analog signal input from the monitor detector 4 or the detector 9 into a digital signal. The control unit 32 executes predetermined processing on the basis of data inputted via the operation unit 20 in addition to the digital signal inputted from the A/D converter 31. For example, the control unit 32 comprehensively measures intensity of fluorescence emitted for a combination of the excitation wavelength and the fluorescence wavelength by repeating a process of sweeping the wavelength of fluorescence emitted from the sample Ml at a predetermined sampling interval while keeping the wavelength of the excitation light with which the sample Ml is irradiated fixed and then shifting the wavelength of the excitation light to the next excitation wavelength. In this way, a spectroscopic analysis spectrum (three-dimensional fluorescence spectrum, fluorescence fingerprint) having three components of the excitation wavelength, the fluorescence wavelength and the fluorescence intensity is obtained. As described above, the spectroscopic analysis spectrum is unique to a composition of the substance. Note that in the following description, the reference numeral of the sample Ml will be omitted as appropriate.

Figure 2A:
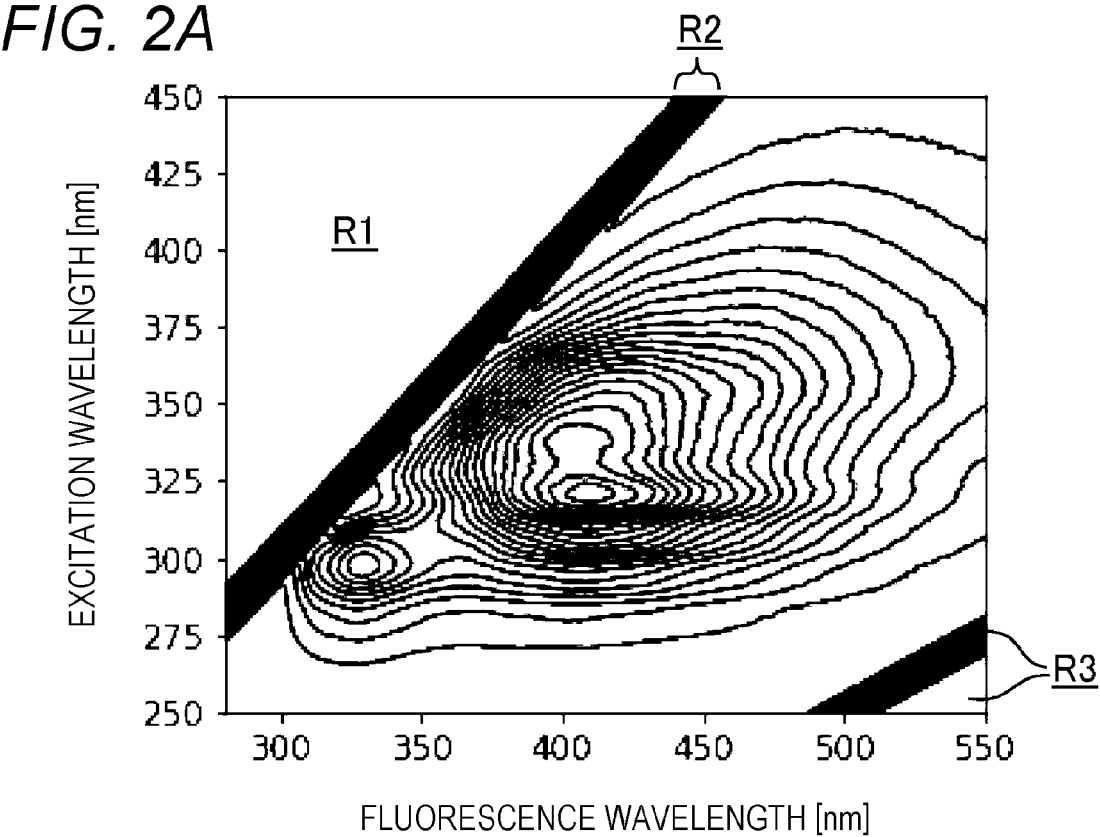
FIG. 2A is a diagram illustrating an example of a spectroscopic analysis spectrum obtained by the spectroscopic analysis system according to the first embodiment.

FIG. 2A is a diagram illustrating an example of a spectroscopic analysis spectrum obtained by the spectroscopic analysis system.

A vertical axis of FIG. 2A indicates the wavelength (excitation wavelength) of the excitation light with which the sample is irradiated. A horizontal axis of FIG. 2A indicates the wavelength (fluorescence wavelength) of fluorescence emitted from the sample. In FIG. 2A, the spectroscopic analysis spectrum is represented by contour lines according to the intensity (fluorescence intensity) of fluorescence emitted from the sample. A non-fluorescent region R1 and regions R2 and R3 related to scattered light illustrated in FIG. 2A are unnecessary data having no particular relationship with fluorescence, and thus, they are excluded from an analysis target as described below.

The non-fluorescent region R1 illustrated in FIG. 2A is a region in which the fluorescence wavelength is shorter than the excitation wavelength. Actually, energy of the fluorescence is smaller than energy of the excitation light, and thus, a phenomenon that the fluorescence wavelength becomes shorter than the excitation wavelength (that is, the energy increases) does not particularly occur. Thus, the non-fluorescent region R1 deviating from definition of fluorescence is excluded from the analysis target.

In addition, excitation light that is reflected from the surface of the sample and directly detected is first-order scattered light, and thus, is excluded from the analysis target. For example, the region R2 that is within ±30 [nm] of a straight line (not illustrated) in which the excitation wavelength is equal to the fluorescence wavelength is excluded from the analysis target. In addition, the region R3 of high-order (secondary or tertiary) scattered light is also excluded from the analysis target. Note that the control unit 32 (see FIG. 1) performs processing of excluding the non-fluorescent region R1 and the regions R2 and R3 related to scattered light from the analysis target.

Figure 2B:
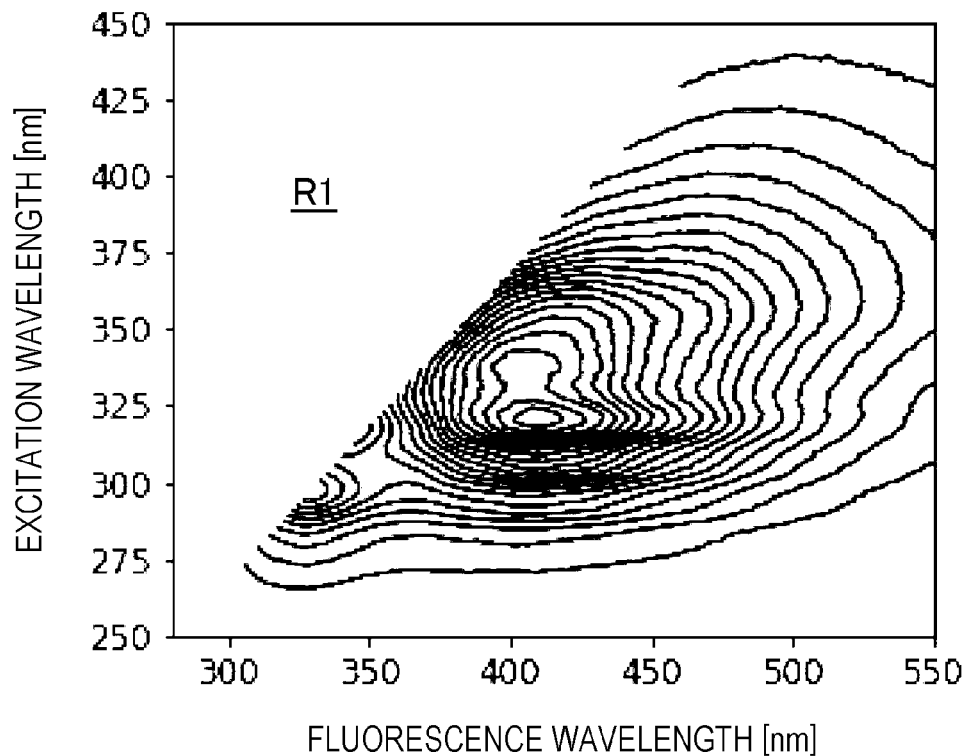
FIG. 2B is a diagram illustrating a state in which the spectroscopic analysis spectrum obtained by the spectroscopic analysis system according to the first embodiment is subjected to predetermined preprocessing.

FIG. 2B is a diagram illustrating a state in which predetermined preprocessing has been performed on the spectroscopic analysis spectrum.

FIG. 2B illustrates a spectrum obtained by excluding the non-fluorescent region R1 and the regions R2 and R3 (see FIG. 2A) related to scattered light, which are not particularly necessary for analysis, from the spectroscopic analysis spectrum (the spectroscopic analysis spectrum has been subjected to the preprocessing). The control unit 32 (see FIG. 1) converts the spectroscopic analysis spectrum after the preprocessing into one dimension as illustrated in FIG. 2C below.

FIG. 2C is an explanatory diagram of data obtained by converting the spectroscopic analysis spectrum into one dimension.

A horizontal axis of FIG. 2C indicates the fluorescence wavelength for each excitation wavelength. In other words, the horizontal axis of FIG. 2C indicates the fluorescence wavelength in a case where one of the plurality of excitation wavelengths in the spectroscopic analysis spectrum is focused on. A vertical axis of FIG. 2C indicates the fluorescence intensity. As indicated in FIG. 2C, for example, in a case where the excitation wavelength is set at 250 [nm], a predetermined spectrum is obtained with the fluorescence wavelength in a range of 285 [nm] to 800 [nm]. Note that a predetermined spectrum can be obtained similarly at other excitation wavelengths. The control unit 32 (see FIG. 1) aligns these pieces of data in a line for each excitation wavelength, develops the data into a vector, and then performs multivariate analysis. Note that the multivariate analysis will be described later in detail.

Figure 3:
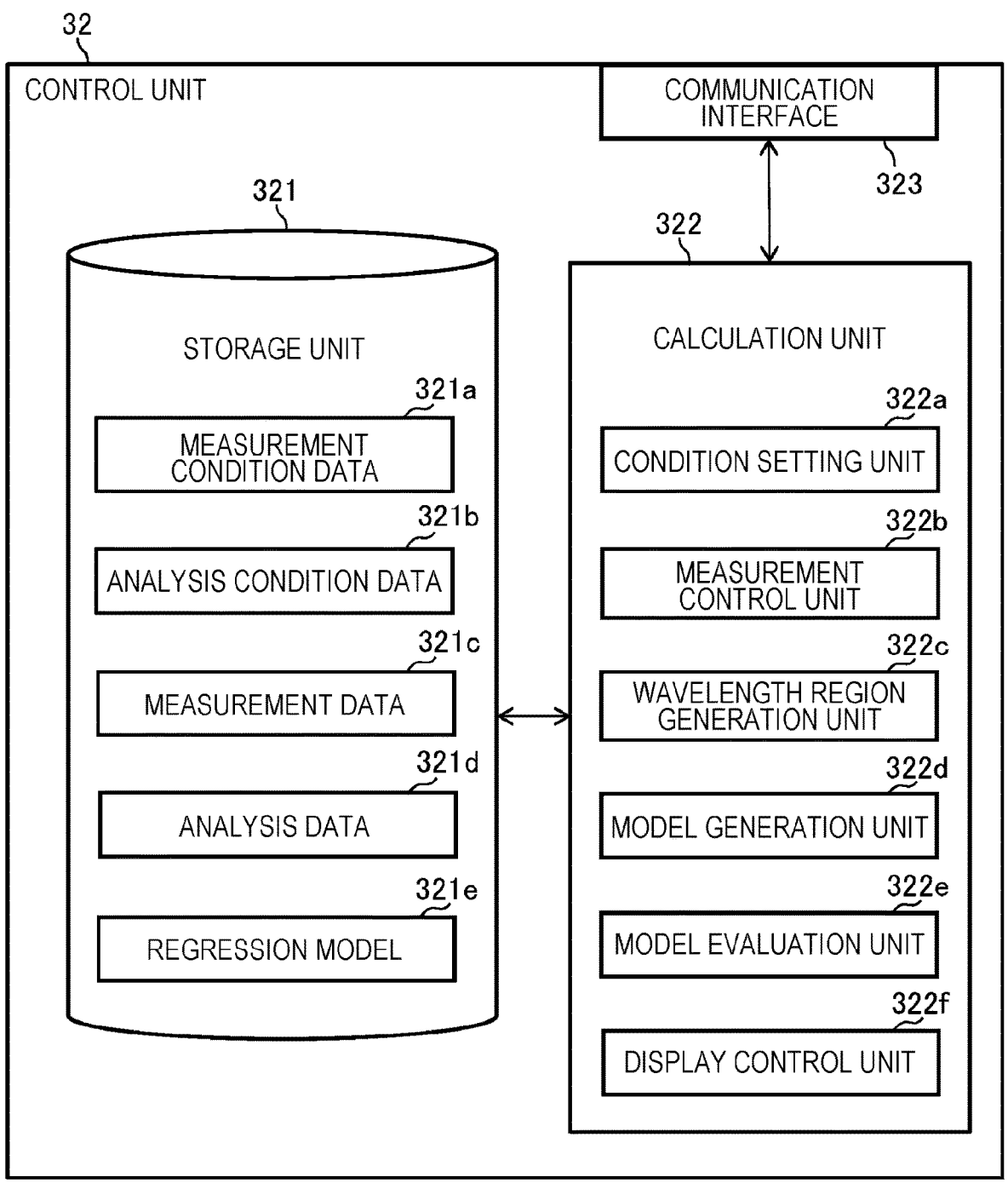
FIG. 3 is a functional block diagram of a control unit included in the spectroscopic analysis system according to the first embodiment.

FIG. 3 is a functional block diagram of the control unit 32 included in the spectroscopic analysis system.

Although not illustrated, the control unit 32 illustrated in FIG. 3 includes electronic circuits such as a central processing unit (CPU), a read only memory (ROM), a random access memory (RAN), and various interfaces as hardware components. Further, a program stored in the ROM is read and loaded into the RAM, and the CPU executes various kinds of processing. Note that the control unit 32 is not particularly required to be configured as one device, and may be configured from a plurality of devices connected via signal lines or may be configured to include a server (not illustrated) connected via a network (not illustrated).

As illustrated in FIG. 3, the control unit 32 includes a storage unit 321, a calculation unit 322, and a communication interface 323. The storage unit 321 stores data including measurement condition data 321a, analysis condition data 321b, measurement data 321c, analysis data 321d, and a regression model 321e.

The measurement condition data 321a is data indicating measurement conditions (see FIG. 5) of the spectroscopic analysis spectrum of the sample. The analysis condition data 321b is data indicating analysis conditions (see FIG. 5) of the spectroscopic analysis spectrum of the sample. The measurement data 321c is data such as a spectroscopic analysis spectrum obtained by measuring the sample. The analysis data 321d is data indicating an analysis result of the sample. The regression model 321e is a prediction model to be used for analysis of the sample. Note that, in the following description, a reference numeral of the regression model 321e will be omitted as appropriate.

The calculation unit 322 illustrated in FIG. 3 includes a condition setting unit 322a, a measurement control unit 322b, a wavelength region generation unit 322c, a model generation unit 322d, a model evaluation unit 322e, and a display control unit 322f.

In a case where predetermined measurement conditions or analysis conditions are inputted via the operation panel 21 (see FIG. 1), the condition setting unit 322a stores the inputted conditions as measurement condition data 321a or analysis condition data 321b in the storage unit 321.

The measurement control unit 322b measures the spectroscopic analysis spectrum of the sample using the photometer unit 10 (see FIG. 1).

After the spectroscopic analysis spectrum is measured, the wavelength region generation unit 322c generates a set of candidates for a wavelength region to be used for generation of the regression model 321e. The wavelength region is specified by each range of the excitation wavelength and the fluorescence wavelength.

The model generation unit 322d generates the regression model 321e for obtaining a predetermined objective variable (composition, concentration, or the like of the sample) on the basis of the spectroscopic analysis spectrum.

The model evaluation unit 322e evaluates prediction performance of the regression model 321e and a measurement period.

The display control unit 322f causes the display unit 22 (see FIG. 1) to display the evaluation result, and the like, of the model evaluation unit 322e in addition to the measurement data 321c and the analysis data 321d.

The communication interface 323 outputs and inputs data to and from the operation panel 21 (see FIG. 1), the display unit 22 (see FIG. 1), and the A/D converter 31 (see FIG. 1).

For example, in a case where fluorescence fingerprint analysis is sequentially performed (that is, in-line measurement is performed) on samples sequentially conveyed by a belt conveyor (not illustrated) of a factory or a facility, when the measurement period is too long, the number of samples (products) processed per unit time is reduced. In addition, in a case where measurement is performed focusing only on a specific excitation wavelength or fluorescence wavelength, the measurement period can be shortened, but there is a possibility that an important spectrum for performing composition discrimination or concentration quantification of the sample cannot be obtained. Thus, in the first embodiment, the user sets an upper limit value of the measurement period to be applied when the fluorescence fingerprint analysis of one sample is performed, and the control unit 32 generates the regression model 321e that can obtain a highly accurate analysis result within the measurement period.

Figure 4:
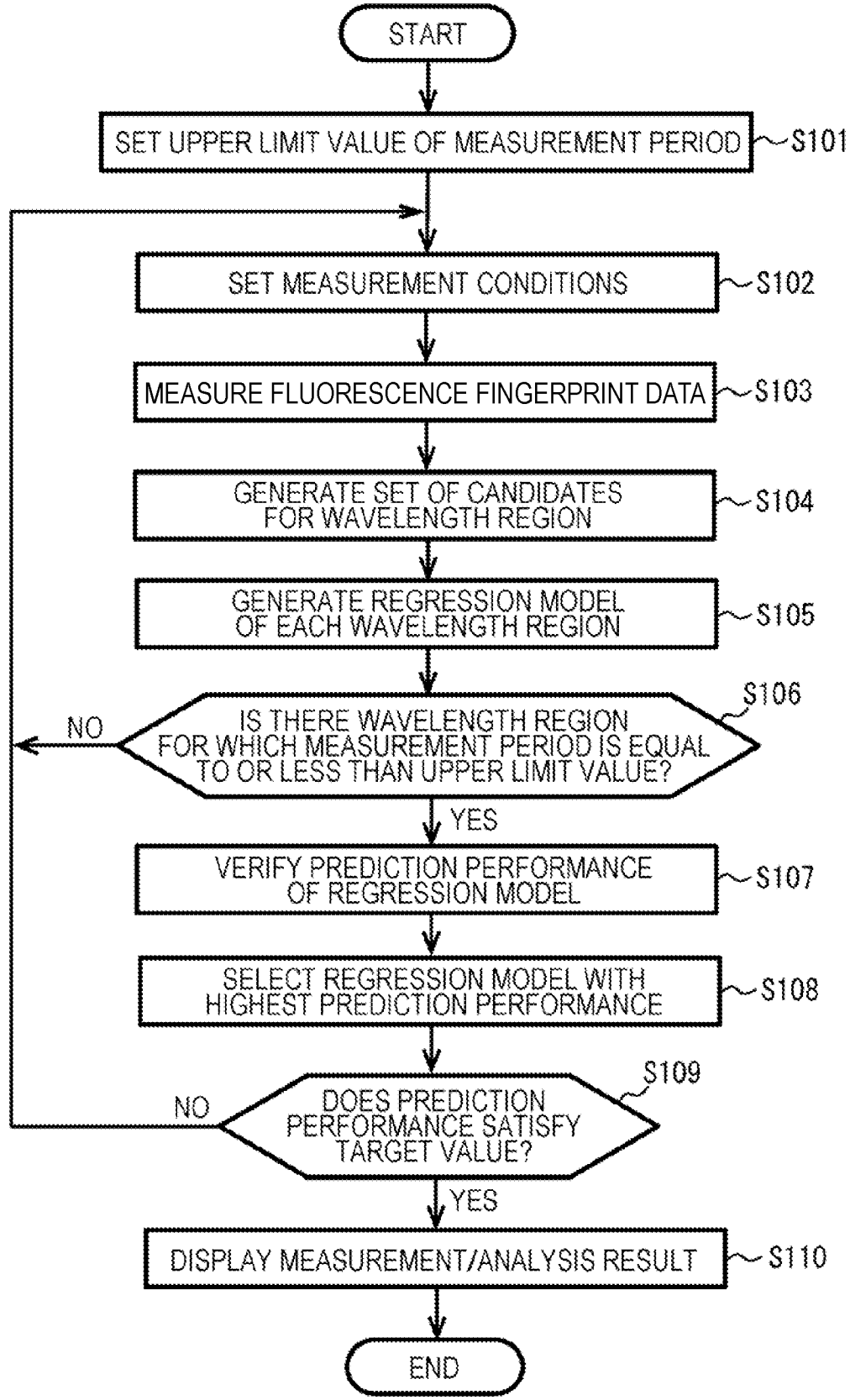
FIG. 4 is a flowchart illustrating processing of the control unit of the spectroscopic analysis system according to the first embodiment.

FIG. 4 is a flowchart illustrating processing of a control unit of the spectroscopic analysis system (see also FIG. 1 as appropriate).

Note that the flowchart of FIG. 4 is, for example, processing to be performed in advance to generate a recommended measurement condition and the regression model prior to in-line measurement in a factory or facility. Incidentally, applications of the spectroscopic analysis system 100 (see FIG. 1) are not limited to the in-line measurement and may be off-line measurement to be performed outside a production line and can be used for various applications such as medical related or food related examinations and research, and individual experiments.

In step S101, the control unit 32 sets the upper limit value of the measurement period by the condition setting unit 322a (see FIG. 3). In other words, the control unit 32 receives an input on the upper limit value of the measurement period of the spectroscopic analysis spectrum as a user setting condition related to measurement of the spectroscopic analysis spectrum of the sample on the basis of operation by the user through the operation panel 21 (input unit) (input processing). The "upper limit value of the measurement period" is an upper limit value of a range that may be allowed by the user with respect to a period used for measuring one sample.

Next, in step S102, the control unit 32 sets measurement conditions by the condition setting unit 322a (see FIG. 3). In other words, the control unit 32 sets the measurement conditions of the spectroscopic analysis system 100 on the basis of operation by the user via the operation panel 21.

FIG. 5 is a display example of a setting screen of the measurement conditions, and the like.

Note that the setting screen in FIG. 5 is displayed on the display unit 22 (see FIG. 1) when the user inputs the upper limit value of the measurement period based on the spectroscopic analysis ("maximum measurement period" in FIG. 5) or the predetermined measurement conditions.

The "measurement conditions" illustrated in FIG. 5 are conditions for measuring the spectroscopic analysis spectrum of the sample as described above. As such "measurement conditions", in the example of FIG. 5, a range of the excitation wavelength, a range of the fluorescence wavelength, a sampling interval of excitation light, a sampling interval of fluorescence, a slit width for excitation light, a slit width for fluorescence, and wavelength scan speed are set (S102 in FIG. 4).

The "range of the excitation wavelength" illustrated in FIG. 5 is a range of the excitation wavelength when the fluorescence fingerprint analysis is performed. The "range of the fluorescence wavelength" is a range of the fluorescence wavelength when the fluorescence fingerprint analysis is performed. The "sampling interval of excitation light" is a sampling interval when the excitation wavelength is swept. The "sampling interval of fluorescence" is a sampling interval when the fluorescence wavelength is swept.

The "slit width for excitation light" indicated in FIG. 5 is a slit width of the diffraction grating 2a of the excitation-side spectroscope 2 (see FIG. 1). The "slit width for fluorescence" is a slit width of the diffraction grating 8a of the fluorescence-side spectroscope 8 (see FIG. 1). The "wavelength scan speed" is sweep speed (scan speed) when one of the excitation wavelength and the fluorescence wavelength is fixed and the other is swept.

As these measurement conditions, for example, each of the range of the excitation wavelength and the range of the fluorescence wavelength may be set to the range of 250 to 750 [nm] (or a partial range thereof). The sampling interval of the excitation wavelength may be set to 10 [nm], the sampling interval of the fluorescence wavelength may be set to 5 [nm], the slit width for excitation light/fluorescence may be set to 5 [nm], and the wavelength scan speed may be set to 60,000 [nm/min]. Each of the numerical values described above is an example, and the measurement conditions are not particularly limited to these values. In addition, a predetermined default value may be displayed as a numerical value of each item of the measurement conditions so that the user may appropriately change the value of each item from the default value.

The "analysis conditions" illustrated in FIG. 5 are conditions when predetermined analysis is performed on the basis of the spectroscopic analysis spectrum of the sample. Note that the "maximum measurement period" relates to both measurement and analysis, but is displayed under the "analysis conditions" in the example of FIG. 5. In a case where the "maximum measurement period" is inputted on the basis of operation by the user through the operation panel 21 (see FIG. 1), the control unit 32 sets the "maximum measurement period" as the upper limit value of the measurement period (S101 in FIG. 4). The "maximum measurement period" may be, for example, a value equal to or less than 10 seconds or may be a predetermined value greater than 10 seconds.

The "wavelength region selection method" illustrated in FIG. 5 is a method for selecting a predetermined measurement wavelength region from the "range of the excitation wavelength" and the "range of the fluorescence wavelength" set by the user. In other words, the control unit 32 (see FIG. 1) displays a plurality of candidates for a wavelength region selection method which is a method for selecting a predetermined measurement wavelength region on the display unit 22 (display device: see FIG. 1) and executes a predetermined wavelength region selection method which is selected from the plurality of candidates by operation of the user through the operation panel 21 (input unit: see FIG. 1). This increases a degree of freedom of the user when the user sets the wavelength region selection method. As the wavelength region selection method, a method using a random number or another known method is used.

The "regression method" illustrated in FIG. 5 is a method to be used for generating a regression model based on multivariate analysis. In other words, the control unit 32 (see FIG. 1) displays a plurality of candidates for a regression method of multivariate analysis to be used in the analysis of the spectroscopic analysis spectrum on the display unit 22 (display device: see FIG. 1) and executes a predetermined regression method selected from the plurality of candidates by the operation of the user through the operation panel 21 (input unit: see FIG. 1). Although details will be described later, as a candidate for the regression method, for example, multiple regression analysis, principal component regression analysis, RF regression, SVM regression partial least squares (PLS) regression, or Lasso regression may be used as appropriate.

Note that, regarding the "wavelength region selection method" and the "regression method", a plurality of candidates may be displayed in a pull-down menu, and one from the plurality of candidates may be selected. In addition, it is not particularly necessary for the user to set all of the items of the measurement conditions and the analysis conditions of FIG. 5, and the items may be a part of those illustrated in FIG. 5.

The "excluded region" illustrated in FIG. 5 is a region that is not particularly necessary for data analysis, such as the non-fluorescent region R1 (see FIG. 2A) and the scattered light regions R2 and R3 (see FIG. 2A) described above. The "measurement result" illustrated in FIG. 5 is a result of measurement/analysis based on the spectroscopic analysis method (for example, fluorescence fingerprint analysis). After the measurement/analysis result based on the spectroscopic analysis method is obtained, specific content of the "measurement result" is displayed (see FIG. 6).

Returning to FIG. 4 again, the description will be continued.

After setting the upper limit value of the measurement period (S101) and setting the measurement conditions (S102), the control unit 32 measures the fluorescence fingerprint data by the measurement control unit 322b in step S103. In other words, the control unit 32 performs fluorescence fingerprint analysis on a predetermined sample on the basis of the measurement conditions set in step S102. Note that, in order to perform composition discrimination or concentration quantification of the sample, a plurality of samples having different concentrations or compositions are prepared, and fluorescence fingerprint data is sequentially measured for each sample. Then, the spectroscopic analysis spectrum (see FIG. 2A) is generated from the measured fluorescent fingerprint data.

Next, in step S104, the control unit 32 generates a set of one or more candidates for a wavelength region by the wavelength region generation unit 322c (see FIG. 3). In other words, the control unit 32 generates a set of one or more candidates for a wavelength region from the entire region that has been specified by the range of the excitation wavelength and the range of the fluorescence wavelength set in the measurement conditions (S102). Here, the "wavelength region" is a region that is specified by a range of the excitation wavelength and a range of the fluorescence wavelength (see wavelength regions G3, G4 in FIG. 7A). For example, the control unit 32 generates a set of one or more candidates for a wavelength region to be used for generation of the regression model on the basis of a predetermined random number. In one or more embodiments, the set of one or more candidates for a wavelength region may include one or more wavelength regions. In one or more embodiments, the set of one or more candidates for a wavelength region includes a plurality of wavelength regions. By including a plurality of wavelength regions, it is possible to include a plurality of portions that greatly contribute to composition discrimination or concentration quantification of the sample without particularly widening a size of individual wavelength regions.

In step S105 of FIG. 4, the control unit 32 generates a regression model of each wavelength region by the model generation unit 322d (see FIG. 3). In other words, the control unit 32 generates a regression model (prediction model) corresponding to each candidate for a wavelength region on the basis of the spectroscopic analysis spectra of a plurality of samples having different compositions or concentrations. As a method of multivariate analysis when generating a regression model, for example, PLS regression analysis or Lasso regression is used.

Next, in step S106, the control unit 32 determines whether or not there is a wavelength region for which the measurement period is equal to or less than a predetermined upper limit value among the set of candidates for a wavelength region. Note that a method of calculating the measurement period depends on a specific measurement method in the photometer unit 10 (see FIG. 1). For example, in a case where the process of sweeping the fluorescence wavelength while keeping the excitation wavelength fixed and sweeping the fluorescence wavelength again after changing the excitation wavelength is repeated, the control unit 32 calculates the measurement period as follows. In other words, the control unit 32 calculates the measurement period on the basis of a sum of a sweep period of the fluorescence wavelength, a return period of the fluorescence wavelength, and a traveling period of the excitation wavelength.

In step S106, in a case where there is no wavelength region for which the measurement period is equal to or less than the upper limit value (S106: No), the processing of the control unit 32 returns to step S102. In this case, a predetermined message for prompting the user to change the measurement conditions is displayed on the display unit 22 (see FIG. 1). Then, the measurement conditions are appropriately changed on the basis of operation by the user through the operation panel 21 (see FIG. 1).

In addition, in step S106, in a case where there is a wavelength region for which the measurement period is equal to or less than the upper limit value among the plurality of wavelength regions (S106: Yes), the processing of the control unit 32 proceeds to step S107. In step S107, the control unit 32 verifies prediction performance of a regression model by the model evaluation unit 322*e* (see FIG. 3). The target of step S107 is a regression model associated with the wavelength region for which the measurement period based on the fluorescence fingerprint analysis is equal to or less than the predetermined upper limit value among the plurality of wavelength regions.

As a method of verifying the prediction performance of the regression model, for example, cross validation is used. In a case where the cross validation is performed, the control unit 32 divides learning data (spectroscopic analysis spectra of a plurality of samples) into a plurality of groups. As a specific example, here, a case where the learning data is divided into five groups is considered (5-fold cross-validation). For example, in a case where there are a total of 20 samples whose concentrations or compositions are known, the control unit 32 divides the spectroscopic analysis spectrum data of the total of 20 samples into a total of 5 groups of 4 samples.

In the 5-fold cross validation, the control unit 32 holds one predetermined group for verification of prediction performance and generates a regression model again for the remaining four groups. Then, the control unit 32 sequentially changes the group for verification of the prediction performance to generate the regression model five times in total. Then, the control unit 32 determines a hyperparameter on the basis of predetermined cross validation. Note that the "hyperparameter" is a predetermined parameter for setting behavior of a machine learning algorithm.

For example, in a case where PLS regression is used when the regression model is generated, the number of components of the PLS is a hyperparameter. As an evaluation index of prediction performance, for example, a mean square error (root-mean square error [RMSE]) or a mean absolute error (MAE) is used. As a specific example, in a case where the RMSE is used in evaluating the prediction performance, the control unit 32 sets an average value of the RMSE in the cross validation repeated five times as an RMSECV and uses the RMSECV as the evaluation index of the prediction performance.

Then, the control unit 32 sets a hyperparameter such that the RMSECV, which is the evaluation index of the prediction performance, is minimized. In this manner, in step S108, the control unit 32 calculates the RMSECV on the basis of the hyperparameter (the number of components of the PLS) optimized for the predetermined measurement conditions and the wavelength region. Note that the evaluation index (for example, the RMSECV) of the prediction performance is calculated for each of the regression models satisfying the condition of step S106.

Next, in step S108, the control unit 32 selects a regression model having the highest prediction performance. For example, the control unit 32 selects a regression model having the smallest value of the RMSECV in the optimized number of components of the PLS.

In step S109, the control unit 32 determines whether or not the prediction performance satisfies a predetermined target value by the model evaluation unit 322*e* (see FIG. 3). For example, the control unit 32 determines whether or not the RMSECV in the regression model selected in step S108 is equal to or less than a predetermined value. The predetermined value is a target value of the prediction performance and is set in advance.

In step S109, in a case where the prediction performance does not satisfy the target value (S109: No), the processing of the control unit 32 returns to step S102. In this case, a message for prompting the user to change the measurement conditions is displayed on the display unit 22 (see FIG. 1). In step S109, in a case where the prediction performance satisfies the target value (S109: Yes), the processing of the control unit 32 proceeds to step S110.

In step S110, the control unit 32 displays the measurement/analysis result by the display control unit 322*f* (see FIG. 3). In other words, the control unit 32 derives a predetermined recommended measurement condition that satisfies the user setting condition related to the measurement period and causes the display unit 22 (display device: see FIG. 1) to display the recommended measurement condition (display processing). As a result, the user can grasp the recommended measurement condition for performing measurement with relatively high prediction performance while reducing the measurement period to be equal to or less than the predetermined upper limit value. Such a result of measurement/analysis is used when the user performs in-line measurement or the like of a sample in a factory or facility. After performing the processing of step S110, the control unit 32 ends the series of processing steps (END).

Figure 6:
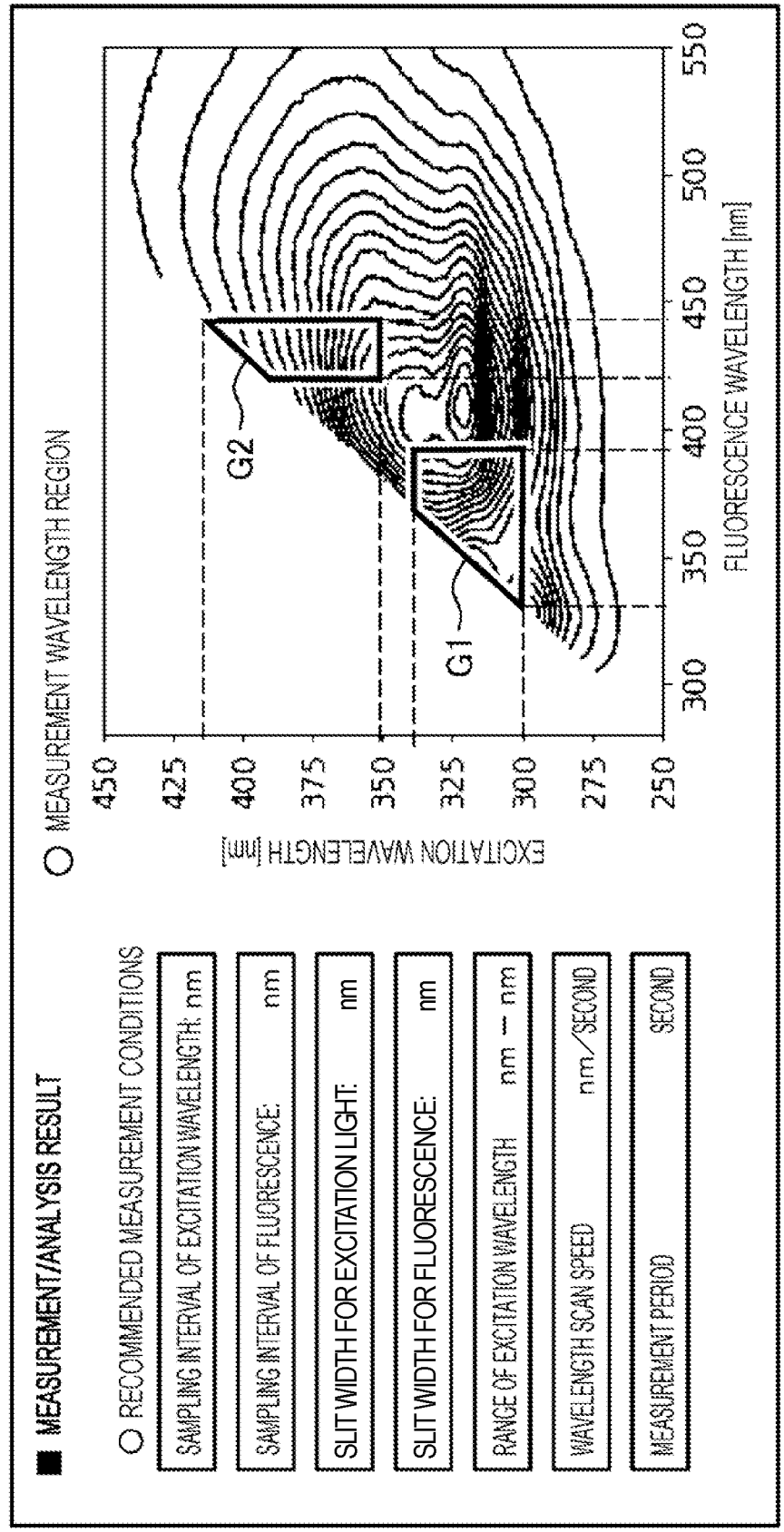
FIG. 6 is a display example of a screen of a measurement/analysis result in the spectroscopic analysis system according to the first embodiment.

FIG. 6 is a display example of a screen of the measurement/analysis result.

In FIG. 6, as the recommended measurement conditions in a case of performing in-line measurement or the like, in addition to the sampling interval of excitation light and the sampling interval of fluorescence for the measurement of the spectroscopic analysis spectrum, the slit width for excitation light, the slit width for fluorescence, the range of the excitation wavelength, the wavelength scan speed, and the measurement period are displayed on the display unit 22 (see FIG. 1). The recommended measurement conditions are measurement conditions in a case where a regression model (S106 in FIG. 4: Yes, S108) having the highest prediction performance among those in which the measurement period satisfies the predetermined upper limit value is used. In FIG. 6, a numerical value in each field of the recommended measurement conditions is not particularly displayed, but a specific numerical value is actually displayed. In addition, the recommended measurement conditions may include the range of the fluorescence wavelength.

Further, in the example of FIG. 6, the control unit 32 causes the display unit 22 (display device: see FIG. 1) to display the recommended measurement conditions and also causes the display unit 22 to display a spectroscopic analysis spectrum based on the fluorescence fingerprint analysis. In the spectroscopic analysis spectrum displayed on the display unit 22, measurement wavelength regions G1 and G2 specified by the range of the excitation wavelength and the range of the fluorescence wavelength are indicated as the wavelength range of the recommended measurement conditions. For example, the control unit 32 may highlight the measurement wavelength regions G1 and G2 by displaying the measurement wavelength regions G1 and G2 in a color or pattern different from those of other regions or by displaying boundaries of the measurement wavelength regions G1 and G2 with thick frame lines. As a result, the user can grasp at a glance which region may be used for measurement of the spectroscopic analysis spectrum.

Further, in one or more embodiments, and as illustrated in FIG. 6, both the recommended measurement condition and the spectroscopic analysis spectrum are displayed on one screen on the display unit 22 (display device: see FIG. 1). As a result, the user can check the measurement wavelength regions G1 and G2 in the spectroscopic analysis spectrum on the same screen while checking the value of each item of the recommended measurement conditions. This improves visibility when the user confirms the recommended measurement conditions and the measurement wavelength regions G1 and G2.

In addition, the number of measurement wavelength regions G1 and G2 (two in the example of FIG. 6) may be set on the basis of operation by the user through the operation panel 21 (input unit: see FIG. 1). This increases a degree of freedom of the user when the user causes the control unit 32 to generate the measurement wavelength regions G1 and G2. In one or more embodiments, a range of the number of measurement wavelength regions may be set on the basis of operation by the user through the operation panel 21. For example, in a case where the number of measurement wavelength regions is set to 2 or more and 5 or less by the operation by the user through the operation panel 21, the wavelength region generation unit 322c (see FIG. 3) generates a set of candidates for a wavelength region for each of the cases where the number of measurement wavelength regions is 2, 3, 4, and 5.

Note that, in order to create a regression model with high prediction performance, it is important to verify many wavelength regions, but if the wavelength regions are generated by a brute-force method, it may take a long time to improve the prediction performance. Thus, for example, when the wavelength region is optimized, the control unit 32 may perform genetic algorithm-based wavelength selection partial least squares (GAWLSPLS) based on a genetic algorithm. Note that the following description of the GAWLSPLS corresponds to the processing of steps S104 to S108 of FIG. 4.

Figure 7A:
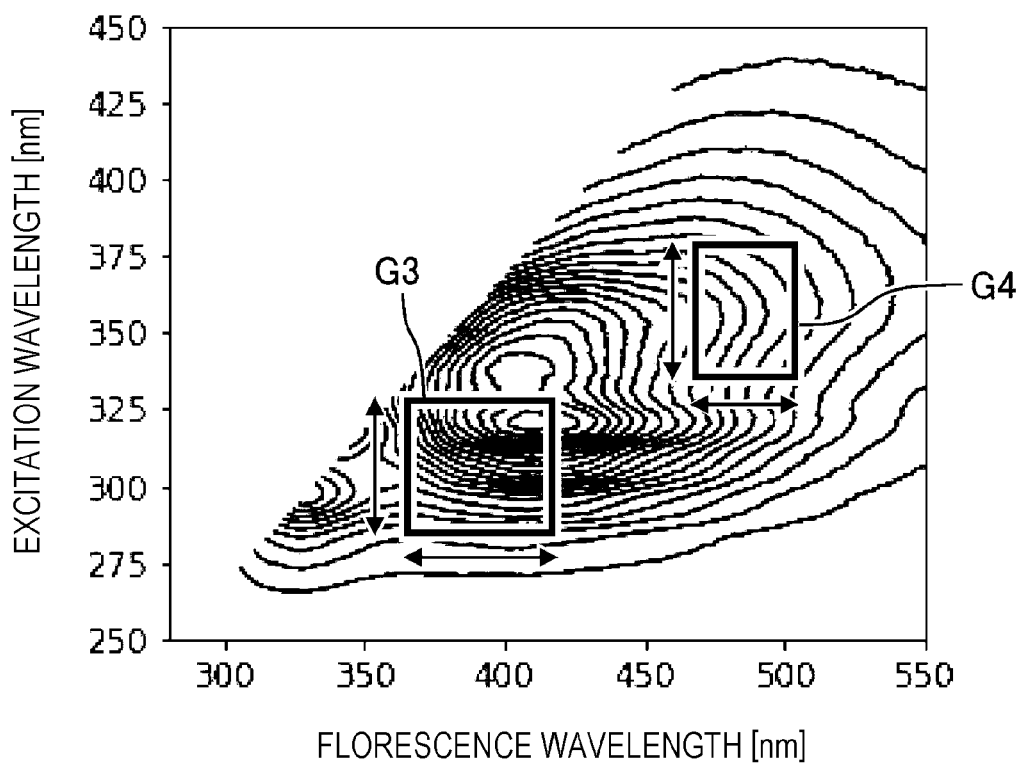
FIG. 7A is an explanatory diagram illustrating a state in which a range of a target wavelength region is changed in a case where a GAWLSPLS method is used in the spectroscopic analysis system according to the first embodiment.

FIG. 7A is an explanatory diagram illustrating a state in which a range of a target wavelength region is changed in a case where the GAWLSPLS method is used.

In the GAWLSPLS method, the control unit 32 (see FIG. 1) first designates the number of wavelength regions to be selected. In the example of FIG. 7A, two wavelength regions G3 and G4 are designated. These wavelength regions G3 and G4 are defined by a start excitation wavelength and a start fluorescence wavelength when the excitation wavelength and the fluorescence wavelength are swept, and a size of each region (a length of the range of the excitation wavelength, a length of the range of the fluorescence wavelength). In the genetic algorithm, the start excitation wavelength and the size of each region of the wavelength regions G3 and G4 are assigned to a predetermined chromosome.

Then, a wavelength region to be used for analysis is derived from each chromosome. On the basis of these wavelength regions, for example, a prediction model (calibration model) for the concentration (objective variable) of the predetermined substance contained in the sample is constructed. In the GAWLSPLS, for example, the above-described RMSECV is used as an index of the goodness of fit of the genetic algorithm. Then, an analysis wavelength region (a wavelength region that is a target for analysis) is determined from the chromosome, and the goodness of fit to this analysis wavelength region is calculated.

In the GAWLSPLS method, a suitable chromosome is selected from the viewpoint of minimizing the RMSECV, which is an index of the goodness of fit, on the basis of the genetic algorithm. Note that a constraint condition is set such that a period required for measuring the wavelength region is equal to or less than the predetermined upper limit value (maximum measurement period). The control unit 32 (see FIG. 1) generates chromosomes (initial population) of a predetermined number of wavelength regions and calculates and evaluates the goodness of fit. Then, the control unit 32 selects one of these chromosomes whose measurement period is equal to or less than the predetermined upper limit value.

In a case where a predetermined convergence condition defined by the user is satisfied, a chromosome having the lowest RMSECV, which is an index of the goodness of fit, in the population becomes a solution. In a case where the predetermined convergence condition is not satisfied, the control unit 32 generates a next generation population by selection, crossing-over, and/or mutation of chromosomes from the population, and evaluates this next generation population. By repeating such a series of processing until the predetermined convergence condition is satisfied, a suitable analysis wavelength region is derived by the control unit 32. Furthermore, the control unit 32 may obtain a plurality of analysis wavelength regions by appropriately changing the number of wavelength regions or a method for generating a random number.

Figure 7B:
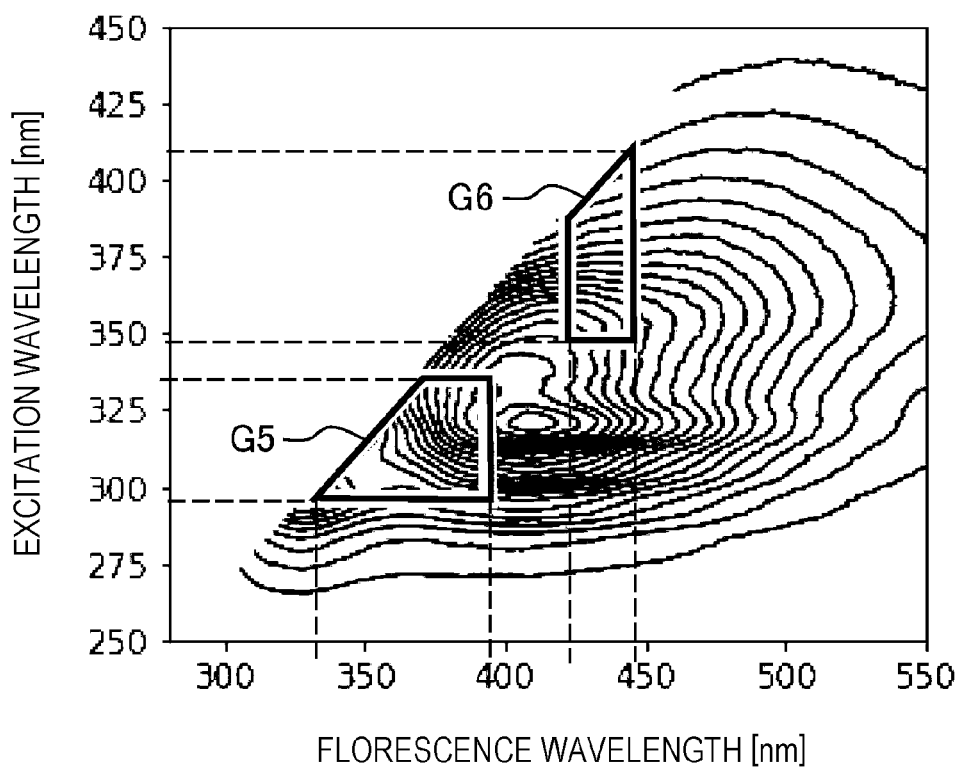
FIG. 7B is an explanatory diagram illustrating a measurement wavelength region that is set on the basis of the GAWLSPLS method in a case where the GAWLSPLS method is used in the spectroscopic analysis system according to the first embodiment.

FIG. 7B is an explanatory diagram illustrating measurement wavelength regions G5 and G6 set on the basis of the GAWLSPLS method.

In the example of FIG. 7B, two trapezoidal measurement wavelength regions G5 and G6 are set as wavelength regions to be used for fluorescence fingerprint analysis such as in-line measurement. Note that the wavelength region specified by the range of the excitation wavelength and the fluorescence wavelength is not particularly limited to having a rectangular shape and may have a trapezoidal shape as illustrated in FIG. 7B. By using the GAWLSPLS method, a wavelength region satisfying a predetermined condition can be efficiently specified on the basis of the genetic algorithm.

In a case where measurement is performed under each of a plurality of conditions, it may take a long time to measure the spectroscopic analysis spectra. Thus, as described below, the control unit 32 may generate a spectroscopic analysis spectrum under different measurement conditions in a pseudo manner using a spectroscopic analysis spectrum acquired under certain specific measurement conditions. An example of an experimental result in a case of using such a method will be described below.

In the experiment, using a vitamin E concentration in an edible oil (15 samples) as an objective variable, measurement was performed under the following conditions: the excitation wavelength range of 250 to 450 nm, the sampling interval of the excitation wavelength of 1 nm, the range of the fluorescence wavelength of 250 to 450 nm, and the sampling interval of the fluorescence wavelength of 2 nm. As the measurement conditions, measurement was performed for each of three cases including a case where the sampling interval of the excitation wavelength was 2 nm and a case where the sampling interval of the excitation wavelength was 3 nm in addition to the above-described case where the sampling interval of the excitation wavelength was 1 nm. For optimization of the excitation wavelength and fluorescence wavelength regions, the GAWLSPLS method was used. The upper limit value of the measurement period (maximum measurement period) was set to 50 seconds. In a case where the sampling interval of the excitation wavelength was extended, the fluorescence intensity was integrated (that is, a sum of the fluorescence intensities is obtained) to generate a spectroscopic analysis spectrum.

FIG. 8 is an explanatory diagram illustrating an example of a case where the fluorescence wavelength is fixed and the excitation wavelength is swept at a predetermined value.

For example, as illustrated in FIG. 8, a case is considered where data is acquired when the excitation wavelength is swept at a sampling interval of 1 [nm], such that the excitation wavelength is at 250 [nm], 251 [nm], 252 [nm], . . . , at the time of measurement. It is also possible to generate in a pseudo manner a spectroscopic analysis spectrum for a case where the sampling interval of the excitation wavelength is 3 nm by utilizing data that has been obtained by sampling the excitation wavelength every 1 nm as described above.

As a method for generating a spectroscopic analysis spectrum in a pseudo manner, for example, there is a method in which data at an excitation wavelength of 251 [nm] or 252 [nm] is not particularly used. In other words, while data obtained at an excitation wavelength of 250 [nm]+3k (k is an integer) is used, data at an excitation wavelength of 251 [nm]+3k and data at an excitation wavelength of 252 [nm]+3k are not used for analysis. In this way, it is possible to shorten the measurement period by so-called thinning out the data.

In addition, for example, there is a method in which respective fluorescence intensities at excitation wavelengths of 250 [nm], 251 [nm], and 252 [nm] are integrated. In other words, a sum of the fluorescence intensities at the excitation wavelengths of 250 [nm]+3k (k is an integer), 251 [nm]+3k, and 252 [nm]+3k may be associated with, for example, 251 [nm]+3k. Thus, the measurement period can be shortened by associating the sum of the fluorescence intensities at three excitation wavelengths that are adjacent to each other at the predetermined sampling interval with any one of the three excitation wavelengths (or an average value of the three excitation wavelengths).

In addition, for example, there is also a method in which respective fluorescence intensities at excitation wavelengths of 250 nm and 252 nm are integrated. In other words, a sum of the fluorescence intensities at the excitation wavelengths of 250 [nm]+3k (k is an integer) and 252 [nm]+3k may be associated with, for example, 250 [nm]+3k. It is also possible to generate the spectroscopic analysis spectrum in a pseudo manner by such a method.

The pseudo spectroscopic analysis spectrum is treated as different data from the original spectroscopic analysis spectrum in a case where measurement is performed at a sampling interval of 1 nm. The same applies to the case of sweeping the fluorescence wavelength instead of the excitation wavelength.

As described above, when the spectroscopic analysis spectrum is measured on the basis of the fluorescence fingerprint analysis, the control unit 32 fixes one of the excitation wavelength and the fluorescence wavelength and sweeps the other wavelength at a predetermined sampling interval. In this case, for each n (where n is a natural number) wavelength values of the other wavelength swept at the predetermined sampling interval, the control unit 32 generates data in which a value obtained by summing some or all of n fluorescence intensities corresponding one-to-one to the n wavelength values of the other wavelength is associated with any of the n wavelength values of the other wavelength. Note that the control unit 32 may generate data in which the value obtained by summing some or all of n fluorescence intensities is associated with an average value of the n wavelength values of the other wavelength. Then, the control unit 32 newly generates a pseudo spectroscopic analysis spectrum on the basis of the generated data and generates a prediction model for analyzing the spectroscopic analysis spectrum on the basis of the pseudo spectroscopic analysis spectrum.

In the experiment, a method in which respective fluorescence intensities at excitation wavelengths of 250 [nm], 251 [nm], and 252 [nm] are integrated (that is, the sum of the fluorescence intensities is obtained) was adopted. This improved an S/N ratio in fluorescence fingerprint analysis. This is because, by integrating the fluorescence intensities, an effect similar to that of actually obtaining the measurement result in a case where the light amount of fluorescence is increased was exhibited.

In a case where the fluorescence intensities at two different wavelength values of the excitation wavelength are integrated (that is, the sum is obtained), the control unit 32 may double the slit width for the excitation light. In a case where the fluorescence intensities at the three wavelength values of the excitation wavelength are integrated, the control unit 32 may triple the slit width for the excitation light. This can improve the S/N ratio. In addition, the control unit 32 may appropriately adjust the scan speed of the fluorescence wavelength, and the like.

FIG. 9 is an explanatory diagram illustrating an experimental result in the fluorescence fingerprint analysis.

In the example of FIG. 9, the case where RMSECV, which is an index of prediction performance, is the smallest is the case where the sampling interval of the excitation wavelength is 2 [nm], and the measurement period in this case is 49.5 seconds. By setting the sampling interval of the excitation wavelength to 2 nm in this way, it is possible to specify the recommended measurement condition with relatively high prediction accuracy in the measurement period that is equal to or less than the predetermined upper limit value (maximum measurement period). In a case where the sampling interval of the excitation wavelength is extended to 3 nm, the RMSECV, which is an index of prediction performance, is slightly poorer, but the measurement period is 15.3 seconds, and similar prediction accuracy can be obtained in a shorter period.

Effects

According to the first embodiment, the control unit 32 derives the recommended measurement condition and the regression model for performing the substance discrimination or the concentration quantification with high accuracy in a period equal to or less than the upper limit value of the measurement period according to the needs of the user. This makes it possible to perform highly accurate substance discrimination and concentration quantification even in usage cases where a restriction of the measurement period is important, such as in-line measurement for industrial processes. In addition, the upper limit value of the measurement period can be appropriately set according to predetermined conditions required in an industrial process. As described above, according to the first embodiment, it is possible to provide a spectroscopic analysis system 100 capable of appropriately performing measurement even in a case where there is a restriction on the measurement period or the like.

Second Embodiment

The second embodiment is different from the first embodiment in that, in a case where the measurement conditions are optimized on the basis of the spectroscopic analysis spectrum, learning data is measured again under the optimized measurement conditions, and a regression model is generated using the learning data that has been measured again. The other configurations (the configuration of the spectroscopic analysis system 100 and the like: see FIG. 1) are the same as those of the first embodiment. Thus, portions different from those of the first embodiment will be described, and description of overlapping portions will be omitted.

Figure 10A:
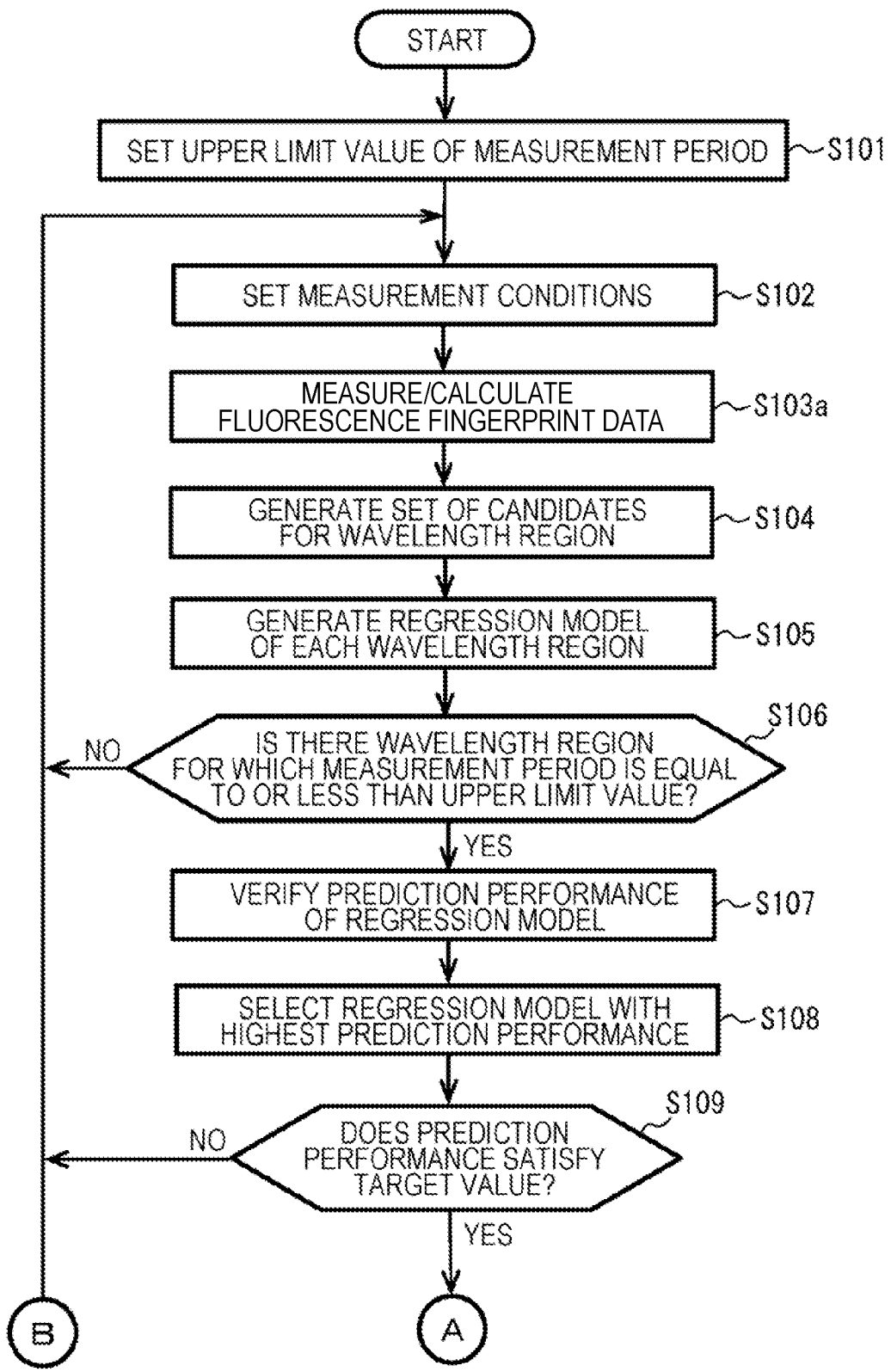
FIG. 10A is a flowchart illustrating processing of a control unit of a spectroscopic analysis system according to a second embodiment.
Figure 10B:
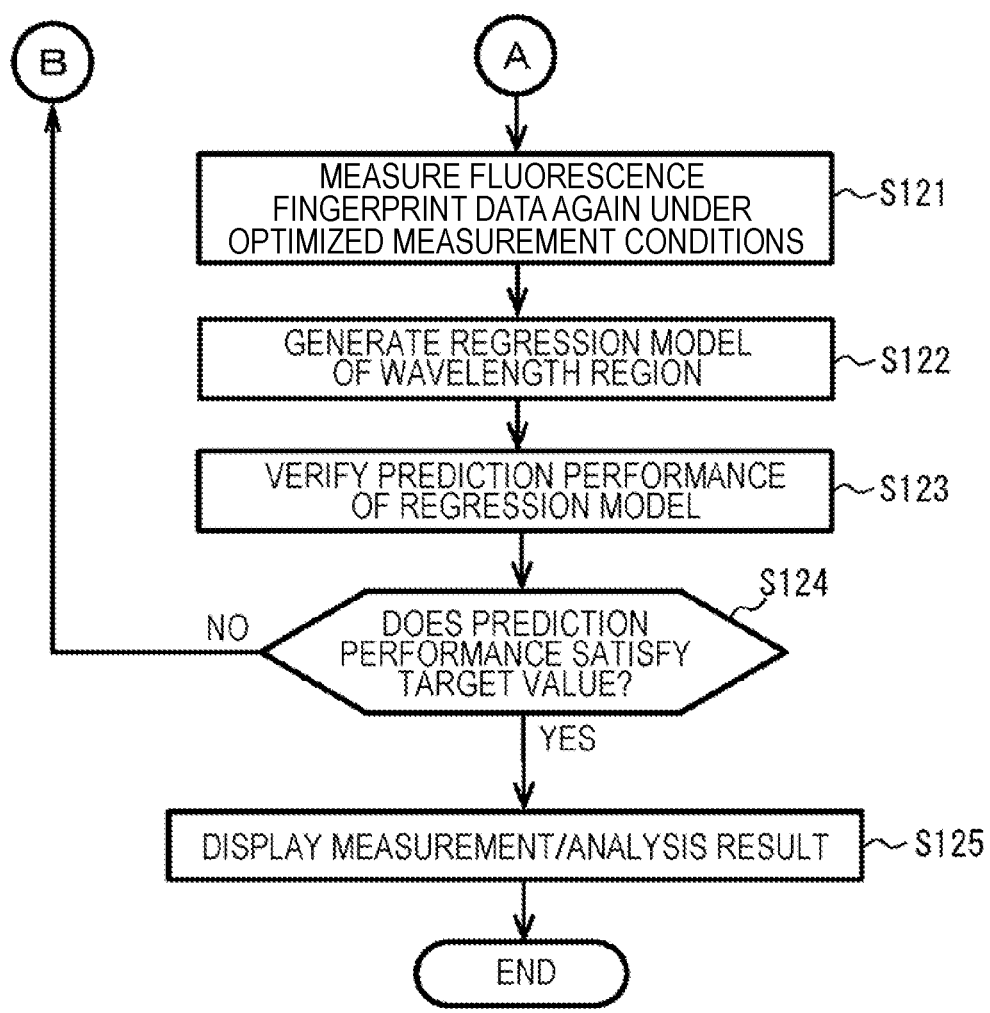
FIG. 10B is a flowchart illustrating processing of the control unit of the spectroscopic analysis system according to the second embodiment.

FIGS. 10A and 10B are flowcharts illustrating processing of the control unit 32 of the spectroscopic analysis system according to the second embodiment (see also FIG. 1 as appropriate).

Note that steps S101, S102, and S104 to S109 in FIG. 10A are the same as those in the first embodiment (see FIG. 4), and thus, description thereof will be omitted. In step S103a illustrated in FIG. 10A, the control unit 32 actually measures fluorescence fingerprint data (spectroscopic analysis spectrum) of a predetermined sample and calculates pseudo fluorescence fingerprint data on the basis of the fluorescence fingerprint data that has been measured.

For example, the control unit 32 obtains the sum of the fluorescence intensities at the excitation wavelengths of 250 [nm]+3k (k is an integer), 251 [nm]+3k, and 252 [nm]+3k and associates the sum of the fluorescence intensities with the excitation wavelength of 251 [nm]+3k. Note that a method of calculating the spectroscopic analysis spectrum in a pseudo manner is similar to that described in the first embodiment, and thus, description thereof will be omitted.

In addition, in a case where the prediction performance satisfies the predetermined target value in step S109 (S109: Yes), the processing of the control unit 32 proceeds to step S120 in FIG. 10B.

In step S121 of FIG. 10B, the control unit 32 measures the fluorescence fingerprint data (spectroscopic analysis spectrum) again under the optimized measurement conditions. In the processing of step S121, the spectroscopic analysis spectrum of the sample is actually measured.

In step S122, the control unit 32 generates a regression model of a wavelength region. This "wavelength region" is a predetermined wavelength region that is associated with a predetermined regression model whose prediction performance satisfies the target value (S109 in FIG. 10A: Yes). As described above, the control unit 32 actually measures the spectroscopic analysis spectrum under the recommended measurement conditions that are based on the pseudo spectroscopic analysis spectrum (S121) and generates the regression model (prediction model) for analyzing the spectroscopic analysis spectrum again on the basis of the spectroscopic analysis spectrum obtained by this measurement (S122). By having the control unit 32 generate the regression model again, it is possible to reduce the influence of error due to the use of the pseudo spectroscopic analysis spectrum in step S103a (see FIG. 10A) and to obtain the regression model with high prediction performance.

Next, in step S123, the control unit 32 verifies the prediction performance of the regression model. Note that the verification method of the prediction performance of the regression model is similar to step S107 (see FIG. 10A), and thus, the description thereof will be omitted.

In step S124, the control unit 32 determines whether or not the prediction performance of the regression model satisfies the predetermined target value. In step S124, in a case where the prediction performance does not satisfy the target value (S124: No), the processing of the control unit 32 returns to step S102 (see FIG. 10A). In this case, a message for prompting the user to change the measurement conditions is displayed on the display unit 22 (see FIG. 1).

In a case where the prediction performance satisfies the predetermined target value in step S124 (S124: Yes), the processing of the control unit 32 proceeds to step S125. In step S125, the control unit 32 causes the display unit 22 to display the measurement result and the analysis result. After performing the processing of step S125, the control unit 32 ends the series of processing steps (END).

Effects

According to the second embodiment, a pseudo spectroscopic analysis spectrum is generated on the basis of predetermined mathematical processing. It is therefore not necessary for an inspector to measure the spectroscopic analysis spectrum after changing the measurement conditions variously, and thus, it is possible to reduce the workload of the inspector and to shorten the period required to specify the regression model with high prediction performance. In addition, the control unit 32 measures the spectroscopic analysis spectrum again under the optimized measurement conditions and generates the regression model on the basis of the measurement result. As a result, even in a case where the pseudo spectroscopic analysis spectrum is used, the prediction accuracy of the regression model can be secured sufficiently.

Third Embodiment

The third embodiment is different from the first embodiment in that sampling intervals or the like in the recommended measurement conditions are different in a plurality of wavelength regions. The other configurations (the configuration of the spectroscopic analysis system 100 and the like: see FIG. 1) are the same as those of the first embodiment. Thus, portions different from those of the first embodiment will be described, and description of overlapping portions will be omitted.

The third embodiment will be described with reference to FIG. 6. For example, in one or more embodiments, the sampling interval of the excitation wavelength and/or the sampling interval of the fluorescence wavelength are/is set for each of the plurality of measurement wavelength regions G1 and G2. As a specific example, by setting resolution to be high in a predetermined measurement wavelength region G1 in the spectroscopic analysis spectrum, data of a detailed shape of the spectroscopic analysis spectrum can be obtained. As a result, it is possible to improve the accuracy when the control unit 32 performs composition discrimination or concentration quantification of a sample. For another measurement wavelength region G2 in the spectroscopic analysis spectrum, information obtained by integrating peak intensities may be important. In such a case, because it takes time to perform the integration, the control unit 32 reduces resolution so that high prediction performance can be obtained in a relatively short period. In this manner, the control unit 32 may change a measurement condition according to the characteristics of each of the plurality of regions included in the spectroscopic analysis spectrum.

As described above, the sampling intervals of at least one of the excitation wavelength or the fluorescence wavelength included in the predetermined recommended measurement conditions are different from each other in the plurality of measurement wavelength regions. The sampling interval of at least one of the excitation wavelength or the fluorescence wavelength in the plurality of measurement wavelength regions is set on the basis of, for example, a genetic algorithm. The inspector may set the sampling intervals of the excitation wavelength and the fluorescence wavelength in the measurement wavelength regions G1 and G2 on the basis of the past experimental data.

Effects

According to the third embodiment, the control unit 32 sets different measurement conditions on the basis of characteristics of the plurality of measurement wavelength regions G1 and G2 specified by each range of the excitation wavelength and the fluorescence wavelength. This makes it possible to perform composition discrimination, concentration quantification, or the like of the sample with high accuracy.

Fourth Embodiment

The fourth embodiment is different from the first embodiment in that a predetermined evaluation index different from the RMSECV is used in order to avoid so-called overfitting (over-learning). Other configurations are the same as those of the first embodiment. Thus, portions different from those of the first embodiment will be described, and description of overlapping portions will be omitted.

The fourth embodiment will be described with reference to FIG. 1. In the first embodiment described above, the case where the RMSECV is used as an index of prediction performance has been described. However, in a case where the RMSECV is minimized by regression analysis such as PLS regression, overfitting (over-learning) may occur. Thus, the control unit 32 may perform the following processing in order to prevent excessive adaptation to the data of the spectroscopic analysis spectrum used at the time of creating the prediction model and to enhance generalization performance.

For example, in the GAWLSPLS method, as a method of dealing with overfitting when a suitable wavelength region is selected from a plurality of analysis wavelength regions, a prediction model may be created using an index other than the RMSECV. Specifically, overfitting can be prevented by using the following evaluation indexes.

Note that j included in the following Expression (1) is the number of components of the PLS, B2 is the Euclidean norm of a regression coefficient vector, and b is the regression coefficient vector. DW included in Expression (2) is a first derivative of the normalized regression coefficient vector. J included in Expression (3) is the Euclidean norm of a change amount of the regression coefficient.

[Math. 1]

$$B2_j = \sqrt{\sum_{i=1}^{p} b_{j,i}^2} \quad (1)$$

[Math. 2]

$$DW_j = \frac{\sum_{i=2}^{p} (b_{j,i} - b_{j,i-1})}{\sum_{i=1}^{p} b_{j,i}^2} \quad (2)$$

[Math. 3]

$$J_j = \sqrt{\sum_{i=2}^{p} (b_{j,i} - b_{j,i-1})^2} \quad (3)$$

For example, in a case where a noise component is included in the regression coefficient, a sum of absolute values of the regression coefficients increases, and thus, a value of each index (B2, DW, J) increases. Thus, these indexes (B2, DW, J) may be appropriately used as evaluation indexes indicating complexity of the regression coefficient vector. In one or more embodiments, for example, even in a case where the RMSECV is relatively small, it is desirable to penalize the prediction model when the complexity of the prediction model is high. Specifically, in one or more embodiments, in order to improve the prediction performance for the unknown model, it is desirable that the value of each index (B2, DW, J) is small. The smaller the RMSECV and the smaller each index (B2, DW, J), the higher the prediction performance for the unknown sample.

The RMSECV and each index (B2, DW, J) are different units, and thus, generalization performance of the regression model can be improved by determining the number of components of the PLS C1 to be described below. Note that j included in Expression (4) is the number of components of the PLS, $RMSECV_{min}$ is a minimum value of the RMSECV, and $RMSECV_{max}$ is a maximum value of the RMSECV. In addition, I included in Expression (4) is any one of B2, DW, and J described above, and Ij is a value when the number of components of the PLS is j. Imin is a minimum value of I, and Imax is a maximum value of I. The first term on the right side of Expression (4) is a value of the RMSECV normalized by a maximum-minimum value. In addition, the second term on the right side of Expression (4) is a value of I normalized by a maximum-minimum value.

[Math. 4]

$$C1 = \frac{RMSECV_j - RMSECV_{min}}{RMSECV_{max} - RMSECV_{min}} + \frac{I_j - I_{min}}{I_{max} - I_{min}} \quad (4)$$

In the fourth embodiment, the above-described B2 (Euclidean norm of the regression coefficient vector) is used as I included in Expression (4), and the GAWLSPLS method is applied using C1 as an index of prediction accuracy. As described above, the control unit 32 (see FIG. 1) searches the measurement wavelength region on the basis of the genetic algorithm, and in the genetic algorithm, for example, C1 is given to the RMSECV, which is an index of goodness of fit of the prediction model for analysis of the spectroscopic analysis spectrum, as a predetermined penalty function indicating a degree of over-learning. Then, the control unit 32 evaluates the prediction model on the basis of the penalty function. As described above, the RMSECV is an average value of a mean square error (RMSE) in cross validation.

Experimental Results

As an example, a case where the quantitative determination of a glucose concentration in a culture solution by near infrared spectroscopy is verified will be described. CRL-12445 (ATCC) was used as a CHO cell, and DMEM-low glucose (manufactured by Sigma-Aldrich) was used as a culture medium. The culture solution was prepared by diffusing CHO cells into the culture medium, measuring the number of cells with an automatic fluorescence cell counting device LUNA-FL (manufactured by Logos Biosystems), and adding the culture medium so that the number of cells was about $1\times10^3$ to $3\times10^3$. This culture solution was seeded in a spinner flask, and the culture solution was stirred with a stirrer and stored in an incubator (temperature: 37° C., CO2 concentration: 5%, air concentration: 95%).

As an incubator, Personal CO2 MULTI-GAS INCUBATOR APM50DR (manufactured by Astec Corporation) was used. Culture for preparing a sample for constructing a calibration model was performed four times (22 samples). In addition, a total of 23 samples were prepared by performing culture for preparing samples for verifying prediction performance of the prepared prediction model (calibration model) six times.

Then, in addition to the actual culture solution sample, the culture solution before culture, the culture solution after culture, and glucose were mixed to prepare a pseudo culture solution sample, and the pseudo culture solution sample was used for measurement. Cells and the like were removed with a filter of 0.2 μm from the culture solution seven days after start of culture, and this culture solution was used as the culture solution after culture for preparing the pseudo culture solution sample. A total of 102 samples were prepared so that the glucose concentrations of these mixed solutions were available in the range of 0 to 8 g/L at increments of 0.5 to 0.6 g/L.

In addition, the pseudo culture solution was collectively processed as data for constructing the calibration model, and transfer learning was performed using the data of the pseudo culture solution. As a transfer learning method, a Frustratingly Easy Domain Adaption method was used. Analysis was performed using the Savitzky-Golay method as a pre-processing method, with the number of points of wavelength at the time of performing fitting set to 21, the order of the polynomial for performing fitting set to 2, and the order of differentiation to be performed thereafter set to 1.

The prediction model was constructed on the basis of the spectral data (spectroscopic analysis spectrum) acquired in this manner and the glucose concentration measured by an enzyme electrode method. For selection of the wavelength region, the GAWLSPLS method was used. The maximum measurement period was 600 seconds. As an index of goodness of fit of the genetic algorithm, RMSECV and C1 were used as two kinds. The number of wavelength regions was set to be in a range of 1 to 10, and repetitive operation was performed ten times for each number of regions to obtain data of a total of 100 wavelength regions. The glucose concentration (23 samples) of the verification sample was predicted using the prediction model based on the data of 100 wavelength regions, and RMSEP (Root-Mean Square Error Prediction) was calculated from the prediction result. The results are indicated in FIGS. 11A and 11B.

Figure 11A:
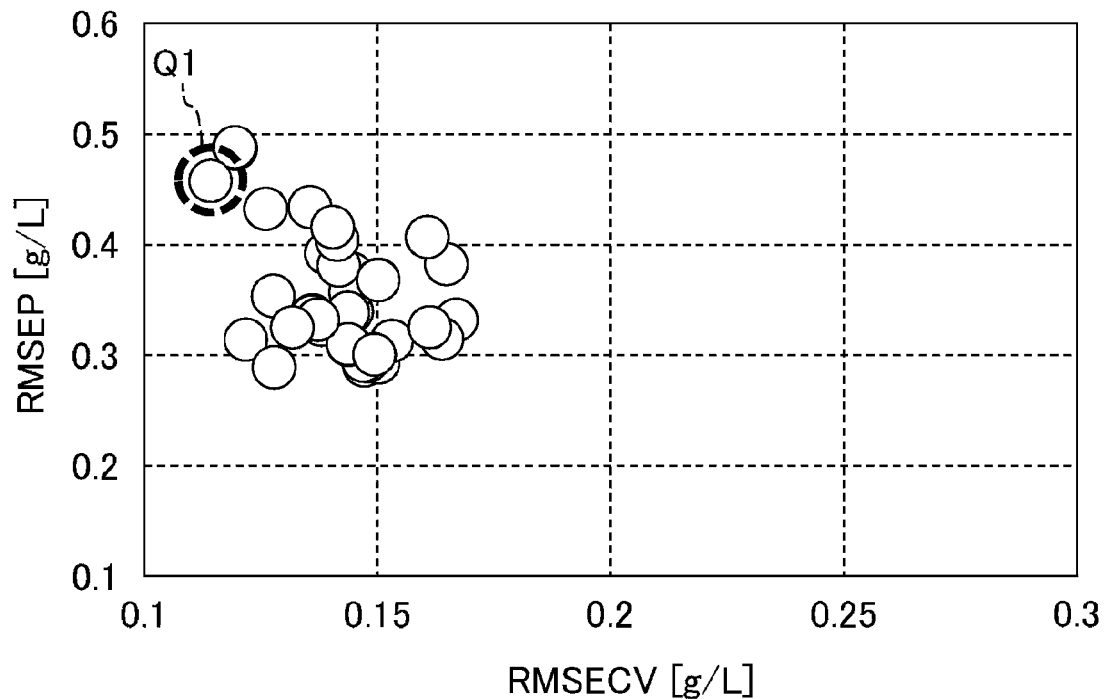
FIG. 11A is a diagram indicating an experimental result in a case where RMSECV is used as an index of goodness of fit in a spectroscopic analysis system according to a fourth embodiment.

FIG. 11A is a diagram indicating an experimental result in a case where the RMSECV is used as an index of goodness of fit.

In FIG. 11A, the horizontal axis represents the RMSECV and the vertical axis represents the RMSEP. As indicated in FIG. 11A, in a case where the RMSECV is used as an index of goodness of fit, there is no particular tendency for the RMSEP to decrease when a value of the RMSECV decreases.

Figure 11B:
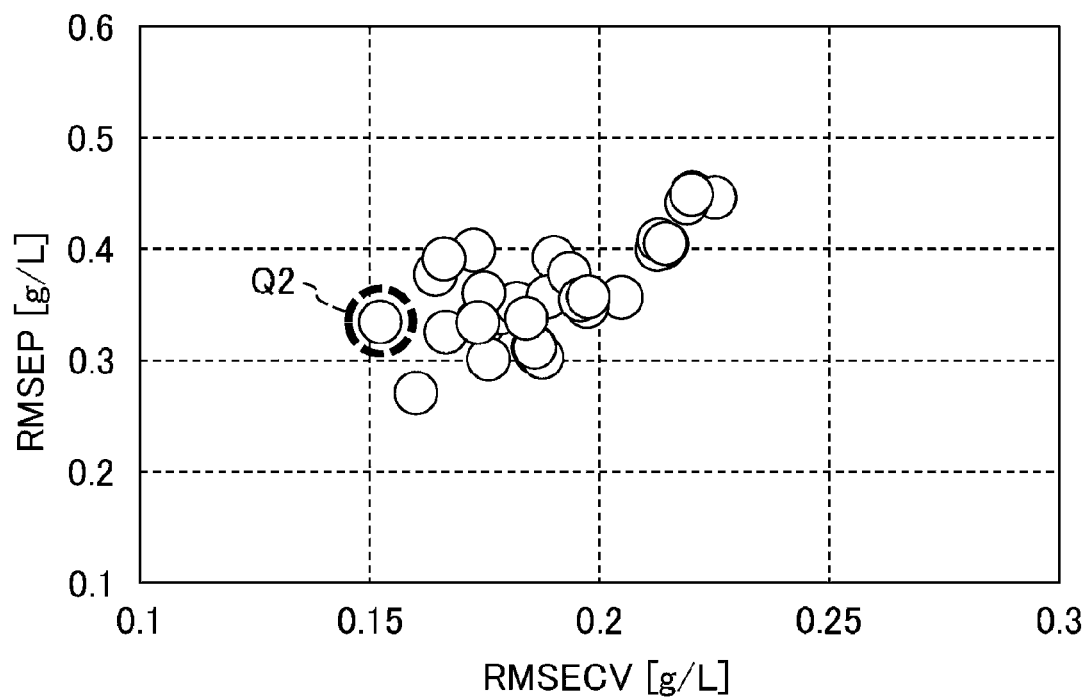
FIG. 11B is a diagram indicating an experimental result in a case where C1 is used as an index of the goodness of fit in the spectroscopic analysis system according to the fourth embodiment.

FIG. 11B is a diagram indicating an experimental result in a case where C1 is used as an index of goodness of fit.

The horizontal and vertical axes in FIG. 11B are the same as the horizontal and vertical axes in FIG. 11A.

In a case where C1 is used as an index of the goodness of fit, as illustrated in FIG. 11B, a tendency for the RMSEP to decrease as the RMSECV decreases is confirmed. In other words, by using C1 as an index of goodness of fit, overfitting is prevented, and prediction performance for the verification sample is improved.

Next, under each condition (index of goodness of fit: RMSECV or C1), prediction was performed for the verification sample using an analysis wavelength range in which the RMSECV was minimized. Note that in FIG. 11A, data having the smallest RMSECV is indicated by a circle Q1. Similarly, in FIG. 11B, data having the smallest RMSECV is indicated by a circle Q2. Results of the prediction using the analysis wavelength range in which the RMSECV is minimized as described above are indicated in FIGS. 12A and 12B.

Figure 12A:
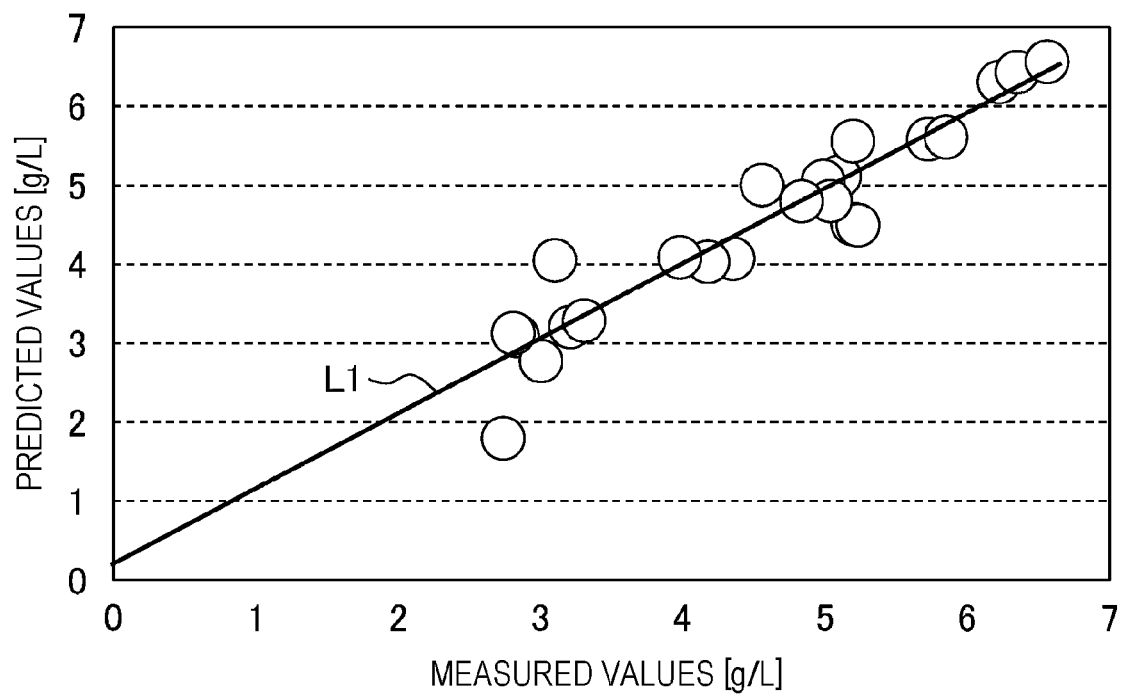
FIG. 12A is a diagram indicating a prediction result of a verification sample in a case where RMSECV is used as an index of the goodness of fit in the spectroscopic analysis system according to the fourth embodiment.

FIG. 12A is a diagram indicating a prediction result of the verification sample in a case where the RMSECV is used as the index of goodness of fit.

Note that the vertical axis in FIG. 12A represents a predicted value of the glucose concentration of the verification sample. The horizontal axis in FIG. 12A represents an actual measurement value of the glucose concentration measured by the enzyme electrode method. FIG. 12A also shows a straight line L1 in which the predicted value is equal to the actually measured value. Collection of data points on this straight line indicates that the prediction performance for the verification sample is high.

Figure 12B:
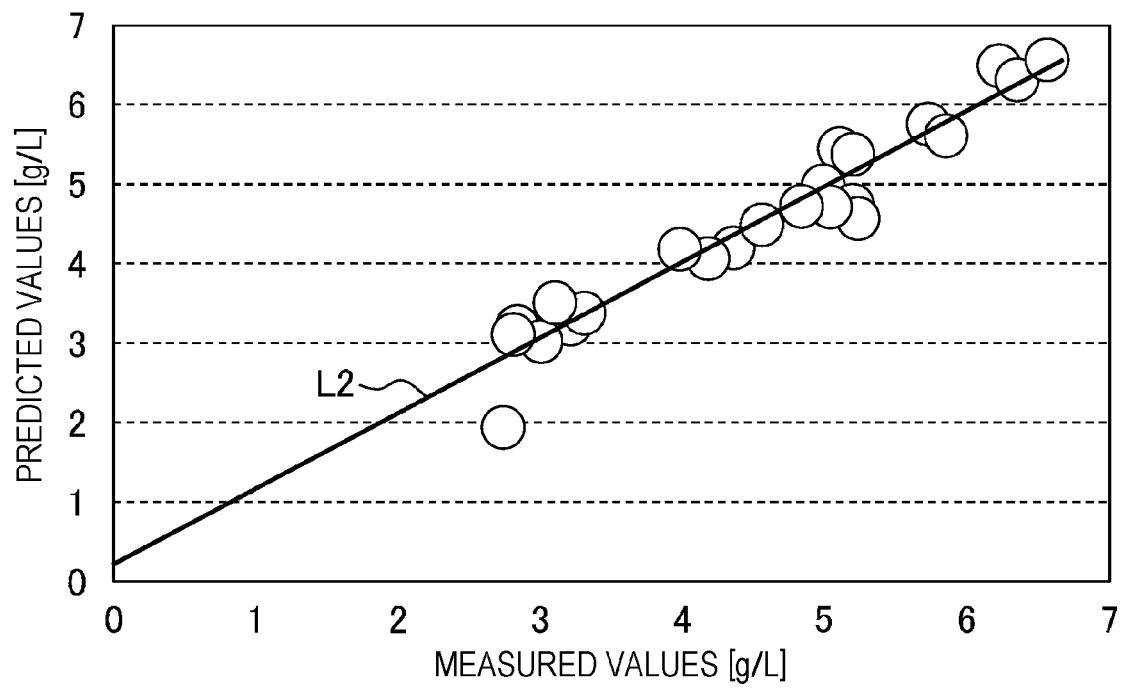
FIG. 12B is a diagram indicating a prediction result of a verification sample in a case where C1 is used as an index of the goodness of fit in the spectroscopic analysis system according to the fourth embodiment.

FIG. 12B is a diagram indicating a prediction result of the verification sample in a case where C1 is used as the index of the goodness of fit.

Note that the vertical axis and the horizontal axis in FIG. 12B are the same as those in FIG. 12A. FIG. 12B also shows a straight line L2 in which the predicted value is equal to the actually measured value. As illustrated in FIG. 12B, in a case where C1 is used as the index of goodness of fit, it is recognized that prediction performance is improved as compared with a case where transfer learning is not performed and the RMSECV is used as the index of goodness of fit (see FIG. 12A). The RMSEP is improved from 0.46 [g/L] to 0.33 [g/L] in a case where C1 is used as the index of goodness of fit. Further, in a case where the index of goodness of fit was set to C1 and transfer learning was further performed, the RMSEP was 0.26 [g/L]. The prediction accuracy can be further improved by changing the index of goodness of fit and applying transfer learning together.

Effects

According to the fourth embodiment, by using a value of C1, or the like, as the index of goodness of fit, over-learning can be prevented and prediction performance of the prediction model can be improved. Thus, composition discrimination, concentration quantification, and the like, of the sample can be performed with high accuracy.

Modifications

Although embodiments of the spectroscopic analysis system 100, and the like, have been described, the disclosure is not limited to these descriptions, and various modifications can be made.

For example, in the first embodiment, the case where the user sets the upper limit value of the measurement period of the spectroscopic analysis spectrum has been described, but the disclosure is not limited thereto. In other words, a lower limit value of the measurement accuracy of the spectroscopic analysis spectrum may be set by the user. Note that, as flow of processing of the control unit 32, the control unit 32 sets the lower limit value of the measurement accuracy according to input operation of the user in place of the processing step S101 of FIG. 4. In addition, in place of the processing step S106, the control unit 32 determines whether or not there is a wavelength region whose measurement accuracy is equal to or greater than the lower limit value. By performing such processing, the user can set the measurement accuracy at the time of measuring the spectroscopic analysis spectrum, which improves usability for the user. Note that, in a case where the RMSECV is used as a measure of the measurement accuracy, because the measurement accuracy is higher the smaller the value of the RMSECV, a maximum value within an allowable range of the RMSECV is used as the "lower limit value of the measurement accuracy".

In one or more embodiments, both the upper limit value of the measurement period and the lower limit value of the measurement accuracy may be set by the user. In other words, as the user setting condition related to the measurement of the spectroscopic analysis spectrum of the sample, at least one of the upper limit value of the measurement period of the spectroscopic analysis spectrum or the lower limit value of the measurement accuracy may be received by operation of the operation panel 21 (input unit: see FIG. 1). As a result, it is possible to search for the recommended measurement conditions desired by the user within one or both of the measurement period and the measurement accuracy. The setting of the lower limit value of the measurement accuracy, and the like, may also be applied to the second to fourth embodiments.

In each embodiment, when the measurement conditions are set in step S102 (see FIG. 4), as illustrated in FIG. 5, a case where one predetermined value is inputted to each item of the sampling interval of excitation light, the sampling interval of fluorescence, the slit width for excitation light, the slit width for fluorescence, and the wavelength scan speed has been described, but the disclosure is not limited thereto. In other words, the user may input a plurality of candidate values or a predetermined numerical range for some or all of the above-described measurement conditions. Then, the control unit 32 may set an optimum value of each item on the basis of the genetic algorithm or the like.

In each embodiment, the case where the fluorescent fingerprint analysis is used as an example of the spectroscopic analysis method has been described, but the disclosure is not limited thereto. For example, absorption spectroscopy, which is also a spectroscopic analysis method, may be used. In a case where the absorption spectroscopy is used, a spectrum of light absorbed by the sample out of light radiated to the sample is measured in order to perform concentration quantification, or the like, of a predetermined substance. In the absorption spectroscopy, the "light to be used for measurement of a spectroscopic analysis spectrum" is light absorbed by the sample.

In each embodiment that has been described, the slit width for excitation light, the slit width for fluorescence, the range of the excitation wavelength, the range of the fluorescence wavelength, and the wavelength scan speed are set as the recommended measurement condition in addition to the sampling interval of excitation light and the sampling interval of fluorescence as illustrated in FIG. 6. However, the disclosure is not limited to this. In other words, the recommended measurement condition may include at least one of a wavelength range of light to be used for measurement of a spectroscopic analysis spectrum, a sampling interval of a wavelength of light, a slit width of a diffraction grating of a spectroscope (for example, the excitation-side spectroscope 2 or the fluorescence-side spectroscope 8; see FIG. 1) that disperses light, or a sweep speed (scan speed) of the wavelength of light. Even in such a case, the control unit 32 can search for a predetermined recommended measurement condition so that a predetermined measurement period or measurement accuracy is satisfied.

In one or more embodiments, for example, the control unit 32 may store a plurality of prediction models in the storage unit 321 (see FIG. 3) and selectively use the prediction models according to a state of the process including the in-line measurement. In other words, when in-line measurement of a sample is performed in an industrial plant, the control unit 32 may switch to a prediction model to be actually used for analysis of a spectroscopic analysis spectrum of the sample from a plurality of prediction models according to a state of the industrial plant. Here, the measurement periods of the spectroscopic analysis spectrum in the measurement wavelength region associated with the plurality of prediction models on a one-to-one basis are different from each other. The "industrial plant" is not limited to a factory and includes various facilities such as a research facility.

For example, in a case where an industrial process including in-line measurement is operating steadily and stably, the control unit 32 sets a period required for measuring one sample to a relatively long predetermined period. In addition, in a case where it is detected that the industrial process is in a state different from a normal state, the control unit 32 shortens the period required for measuring one sample in order to shift the industrial process to a steady and stable state. As described above, the control unit 32 may choose a prediction model according to a state of the industrial process, so that the industrial process including the in-line measurement can be appropriately controlled.

In addition, in the first embodiment, the description has been given of the case where the control unit 32 determines whether or not there is a wavelength region for which the measurement period of the spectroscopic analysis spectrum is equal to or less than the upper limit value (S106 in FIG. 4) and then selects the regression model with the highest prediction performance (S108), but the disclosure is not limited thereto. For example, the control unit 32 may perform determination related to the measurement period in descending order of the prediction performance among the regression models of the respective wavelength regions. Similar effects are obtained by such processing.

In the first embodiment, the case where the photometer unit 10 (see FIG. 1) includes the excitation-side filter 5 (see FIG. 1) and the fluorescence-side filter 7 (see FIG. 1) has been described, but these may be appropriately omitted.

In the first embodiment, the case where the processing result of the control unit 32 (see FIG. 1) is displayed on the display unit 22 (see FIG. 1) has been described, but the disclosure is not limited thereto. For example, the processing result of the control unit 32 may be transmitted to a mobile terminal (not illustrated) such as a mobile phone, a smartphone, or a tablet. In this case, a display of the mobile terminal functions as a display unit.

In the first embodiment, the case where the measurement period, or the like, is inputted by operation of the input unit (see FIG. 1) by the user has been described, but the disclosure is not limited thereto. For example, the measurement period, or the like, may be inputted on the basis of operation of the mobile terminal (see FIG. 1) by the user. In this case, a button or a touch panel of the mobile terminal functions as the "input unit". The same may apply to the second to fourth embodiments.

In addition, all or a part of a program for implementing functions (spectroscopic analysis method) of the spectroscopic analysis system 100, and the like, described in each embodiment may be executed by one or a plurality of computers such as a server (not illustrated). The above-described program may be provided via a communication line, or may be distributed by being written in a recording medium such as a CD-ROM.

In addition, each embodiment has been described in detail in order to describe the disclosure in an easy-to-understand manner, but the disclosure is not necessarily limited to those having all the described configurations. In addition, it is possible for a part of the configuration of the embodiment to be added or replaced with another configuration or deleted. In addition, the above-described mechanisms and configurations are illustrated for the description, and not all the mechanisms and configurations are necessarily illustrated in a product.

What is claimed is:

1. A spectroscopic analysis system comprising:
an inputter that receives an input of at least one of an upper limit value of a measurement period of a spectroscopic analysis spectrum or a lower limit value of measurement accuracy as a user setting condition related to measurement of the spectroscopic analysis spectrum of a sample; and
a controller that derives a predetermined recommended measurement condition that satisfies the user setting condition and causes a displayer to display the recommended measurement condition,
wherein the recommended measurement condition includes at least one of a wavelength range of light to be used for measurement of the spectroscopic analysis spectrum, a sampling interval of a wavelength of the light, a slit width of a diffraction grating of a spectroscope that disperses the light, or a sweep speed of the wavelength of the light.

2. The spectroscopic analysis system according to claim 1, wherein
the controller causes the displayer to display the recommended measurement condition and also causes the displayer to display the spectroscopic analysis spectrum based on fluorescence fingerprint analysis; and
on the spectroscopic analysis spectrum displayed on the displayer, a measurement wavelength region specified by a range of an excitation wavelength and a range of a fluorescence wavelength is indicated as the wavelength range of the recommended measurement condition derived by the controller.

3. The spectroscopic analysis system according to claim 1, wherein both the recommended measurement condition and the spectroscopic analysis spectrum are displayed on one screen on the displayer.

4. The spectroscopic analysis system according to claim 2, wherein
a number of the measurement wavelength region is set on a basis of operation by a user through the inputter, or
a range of the number of the measurement wavelength region is set on a basis of operation by the user through the inputter, wherein
the number of measurement wavelength region is an integer number of regions of wavelength that will be derived by the controller.

5. The spectroscopic analysis system according to claim 1, wherein
the controller is configured to:
cause the displayer to display a plurality of candidates for a wavelength region selection method that is a method for selecting the measurement wavelength region; and
execute a predetermined wavelength region selection method that has been selected from the plurality of candidates by operation of a user through the inputter.

6. The spectroscopic analysis system according to claim 1, wherein
the controller is configured to:
cause the displayer to display a plurality of candidates for a regression method of multivariate analysis to be used in analysis of the spectroscopic analysis spectrum; and
execute a predetermined regression method that has been selected from the plurality of candidates by operation of a user through the inputter; and
evaluate the prediction performance of the regression model and the measurement period.

7. A spectroscopic analysis system comprising:
an inputter that receives an input of at least one of an upper limit value of a measurement period of a spectroscopic analysis spectrum or a lower limit value of measurement accuracy as a user setting condition related to measurement of the spectroscopic analysis spectrum of a sample; and
a controller that derives a predetermined recommended measurement condition that satisfies the user setting condition and causes a displayer to display the recommended measurement condition,
wherein the recommended measurement condition includes at least one of a wavelength range of light to be used for measurement of the spectroscopic analysis spectrum, a sampling interval of a wavelength of the light, a slit width of a diffraction grating of a spectroscope that disperses the light, or a sweep speed of the wavelength of the light; and wherein
when the spectroscopic analysis spectrum is measured on a basis of fluorescence fingerprint analysis and the controller fixes one of an excitation wavelength or a fluorescence wavelength and sweeps the other one of the excitation wavelength or the fluorescence wavelength at a predetermined sampling interval, the controller:
newly generates a pseudo spectroscopic analysis spectrum on a basis of data in which, for each n (where n is a natural number) wavelength values of the other one swept at the predetermined sampling interval, a value of a sum of a part or all of n fluorescence intensities corresponding one-to-one to the n wavelength values of the other one is associated with any of the n wavelength values of the other one or on a basis of data in which, for each n wavelength values of the other one swept at the predetermined sampling interval, the value of the sum is associated with an average value of the n wavelength values of the other one; and
generates a prediction model for analysis of the spectroscopic analysis spectrum on a basis of the pseudo spectroscopic analysis spectrum.

8. The spectroscopic analysis system according to claim 7, wherein
the controller is configured to:
actually measure a spectroscopic analysis spectrum under the recommended measurement condition that is based on the pseudo spectroscopic analysis spectrum; and generate a prediction model for analysis again on a basis of an analysis spectrum obtained by the measurement.

9. The spectroscopic analysis system according to claim 2, wherein sampling intervals of at least one of an excitation wavelength or a fluorescence wavelength included in the recommended measurement condition are different from each other in a plurality of the measurement wavelength regions.

10. The spectroscopic analysis system according to claim 9, wherein the sampling intervals of the at least one of the excitation wavelength or the fluorescence wavelength in the plurality of the measurement wavelength regions are set on a basis of a genetic algorithm.

11. The spectroscopic analysis system according to claim 2, wherein the controller is configured to perform a search of the measurement wavelength region on a basis of a genetic algorithm, give a predetermined penalty function indicating a degree of over-learning to an RMSECV that is an index of goodness of fit of a prediction model for analysis of the spectroscopic analysis spectrum in the genetic algorithm, and evaluate the prediction model on a basis of the penalty function, and
the RMSECV is an average value of a mean square error in cross validation.

12. The spectroscopic analysis system according to claim 1, wherein when in-line measurement of the sample is performed in an industrial plant, the controller is configured to switch to a prediction model that is to be actually used for analysis of the spectroscopic analysis spectrum of the sample from among a plurality of prediction models according to a state of the industrial plant.

13. A spectroscopic analysis method comprising: input processing of receiving an input of at least one of an upper limit value of a measurement period of a spectroscopic analysis spectrum or a lower limit value of measurement accuracy as a user setting condition related to measurement of the spectroscopic analysis spectrum of a sample; and display processing of deriving, at a controller, a predetermined recommended measurement condition that satisfies the user setting condition and causing a displayer to display the recommended measurement condition, wherein the recommended measurement condition includes at least one of a wavelength range of light to be used for measurement of the spectroscopic analysis spectrum, a sampling interval of a wavelength of the light, a slit width of a diffraction grating of a spectroscope that disperses the light, or a sweep speed of the wavelength of the light.

* * * * *